(12) United States Patent
Oshida et al.

(10) Patent No.: US 9,960,914 B2
(45) Date of Patent: May 1, 2018

(54) SEMICONDUCTOR DEVICE AND INFORMATION PROCESSING SYSTEM FOR ENCRYPTED COMMUNICATION

(71) Applicant: Renesas Electronics Corporation, Kawasaki-shi, Kanagawa (JP)

(72) Inventors: Daisuke Oshida, Kanagawa (JP); Shigemasa Shiota, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days. days.

(21) Appl. No.: 14/064,377

(22) Filed: Oct. 28, 2013

(65) Prior Publication Data
US 2014/0133652 A1 May 15, 2014

(30) Foreign Application Priority Data

Nov. 12, 2012 (JP) .................................. 2012-248628

(51) Int. Cl.
*H04L 29/06* (2006.01)
*H04L 9/08* (2006.01)

(52) U.S. Cl.
CPC .......... *H04L 9/0866* (2013.01); *H04L 9/0897* (2013.01); *H04L 2209/34* (2013.01)

(58) Field of Classification Search
CPC .. H04L 9/0866; H04L 9/0897; H04L 2209/34
USPC ....................................................... 380/255
See application file for complete search history.

(56) References Cited

U.S. PATENT DOCUMENTS

| 3,788,303 | A  | * | 1/1974 | Hall ..................... A61B 1/0052 |
| | | | | 600/148 |
| 6,256,391 | B1 | | 7/2001 | Ishiguro et al. |
| 8,290,150 | B2 | | 10/2012 | Erhart et al. |
| 8,347,091 | B2 | | 1/2013 | Nonaka et al. |
| 8,667,265 | B1 | * | 3/2014 | Hamlet ................. H04L 9/0866 |
| | | | | 326/80 |
| 2004/0042620 | A1 | * | 3/2004 | Andrews ............... H04L 9/0894 |
| | | | | 380/286 |
| 2006/0133607 | A1 | | 6/2006 | Forehand et al. |
| 2007/0160204 | A1 | * | 7/2007 | Kimura et al. ................. 380/46 |
| 2008/0005030 | A1 | * | 1/2008 | Schlarb ................... G06F 21/10 |
| | | | | 705/57 |

(Continued)

OTHER PUBLICATIONS

Official Action dated Jul. 26, 2016, issued in Japanese counterpart application (No. 2012-248628) with English translation.

*Primary Examiner* — Harunur Rashid
(74) *Attorney, Agent, or Firm* — Womble Bond Dickinson (US) LLP

(57) ABSTRACT

In a semiconductor device and an information processing system according to one embodiment, an external device generates external device unique information by using a unique code which is a value unique to the semiconductor device, and generates second information by encrypting the first information with the use of the external device unique information. The semiconductor device stores the second information and generates the principal device unique information independently of the external device, with the use of the unique code of the semiconductor device holding the second information, and decrypts the second information with the use of the principal device unique information to obtain the first information.

25 Claims, 20 Drawing Sheets

(56) References Cited

U.S. PATENT DOCUMENTS

| | | | |
|---|---|---|---|
| 2008/0320318 A1* | 12/2008 | Huang | G11B 20/00086 |
| | | | 713/193 |
| 2009/0183248 A1 | 7/2009 | Tuyls et al. | |
| 2010/0031065 A1* | 2/2010 | Futa | H03K 3/0315 |
| | | | 713/194 |
| 2010/0122093 A1 | 5/2010 | Tuyls et al. | |
| 2012/0066571 A1 | 3/2012 | Marinet | |
| 2012/0137137 A1* | 5/2012 | Brickell | G06F 21/73 |
| | | | 713/182 |
| 2013/0016833 A1* | 1/2013 | Brown | H04L 63/062 |
| | | | 380/44 |
| 2013/0051552 A1* | 2/2013 | Handschuh et al. | 380/44 |
| 2014/0093074 A1* | 4/2014 | Gotze et al. | 380/45 |
| 2014/0108786 A1* | 4/2014 | Kreft | 713/156 |
| 2014/0185795 A1* | 7/2014 | Gotze et al. | 380/44 |
| 2014/0201540 A1* | 7/2014 | Li | H04L 9/0894 |
| | | | 713/193 |
| 2014/0270177 A1* | 9/2014 | Brickell et al. | 380/278 |
| 2014/0310515 A1* | 10/2014 | Kim et al. | 713/155 |

\* cited by examiner

SEMICONDUCTOR DEVICE AND INFORMATION PROCESSING SYSTEM FOR ENCRYPTED COMMUNICATION

CROSS-REFERENCE TO RELATED APPLICATIONS

The disclosure of Japanese Patent Application No. 2012-248628 filed on Nov. 12, 2012 including the specification, drawings and abstract is incorporated herein by reference in its entirety.

BACKGROUND

The present invention relates to a semiconductor device and an information processing system, especially to a semiconductor device and an information processing system which perform encryption operations and encrypted communication.

In recent years, various kinds of security technology which use encryption technology have been proposed with the aim of improving resistance to unauthorized access to a semiconductor device or providing measures against an imitation. In the encryption technology, an encryption key is employed. The encryption technology, however, has a problem that when the encryption key is illegally acquired by an attacker, unauthorized access to the semiconductor device becomes possible. Accordingly, information which is harmful when leaked, such as key information, must be prevented from external leakage as confidential information Patent Literatures 1 to 4 disclose techniques of security measures on the key information as one of the confidential information.

In all of the techniques disclosed by Patent Literatures 1 to 4, the confidential information such as the key information is generated by using an eigenvalue which differs according to variations in manufacturing of semiconductor devices, such as a silicon ID or a PUF (Physically Unclonable Function). In Patent Literatures 1 to 4, such an eigenvalue includes an error, therefore, in the case of generating definitive confidential information by using such an eigenvalue, it is necessary to perform error correcting to the eigenvalue. By generating the confidential information on the basis of such an eigenvalue, it becomes unnecessary to hold the confidential information as a fixed value, leading to improvement of the security of the semiconductor device.

PATENT LITERATURE (Patent Literature 1) International Publication WO 2008/056612

(Patent Literature 2) Published Japanese Unexamined Patent Application No. 2006-179001

(Patent Literature 3) Published Japanese Translation of PCT International Publication No. 2010-527219

(Patent Literature 4) Published Japanese Translation of PCT International Publication No. 2008-545323

SUMMARY

However, when a silicon ID or a PUF is employed, an error of the eigenvalue occurs at random. Therefore, it may be necessary to perform multiple readings in order to obtain a correct eigenvalue. Accordingly, there arises an issue that the response of the semiconductor device deteriorates when the number of readings increases.

The other issues and new features of the present invention will become clear from the description of the present specification and the accompanying drawings.

According to one embodiment of the present invention, a semiconductor device and an information processing system generate, in an external device, external device unique information with the use of a unique code which is a value unique to the semiconductor device, and generate second information by encrypting first information stored in the external device with the use of the external device unique information concerned. Then, the semiconductor device stores the second information concerned, generates principal device unique information independently of the external device with the use of the unique code held in the semiconductor device, and decrypts the second information with the use of the principal device unique information to recover the first information.

In addition, a method, and a computer program which makes a computer perform all or a part of the functions of device, or the like are also illustrative of the present invention.

According to the one embodiment of the present invention, the semiconductor device and the information processing system can enhance the responsiveness of the semiconductor device.

DETAILED DESCRIPTION

Figure 1:
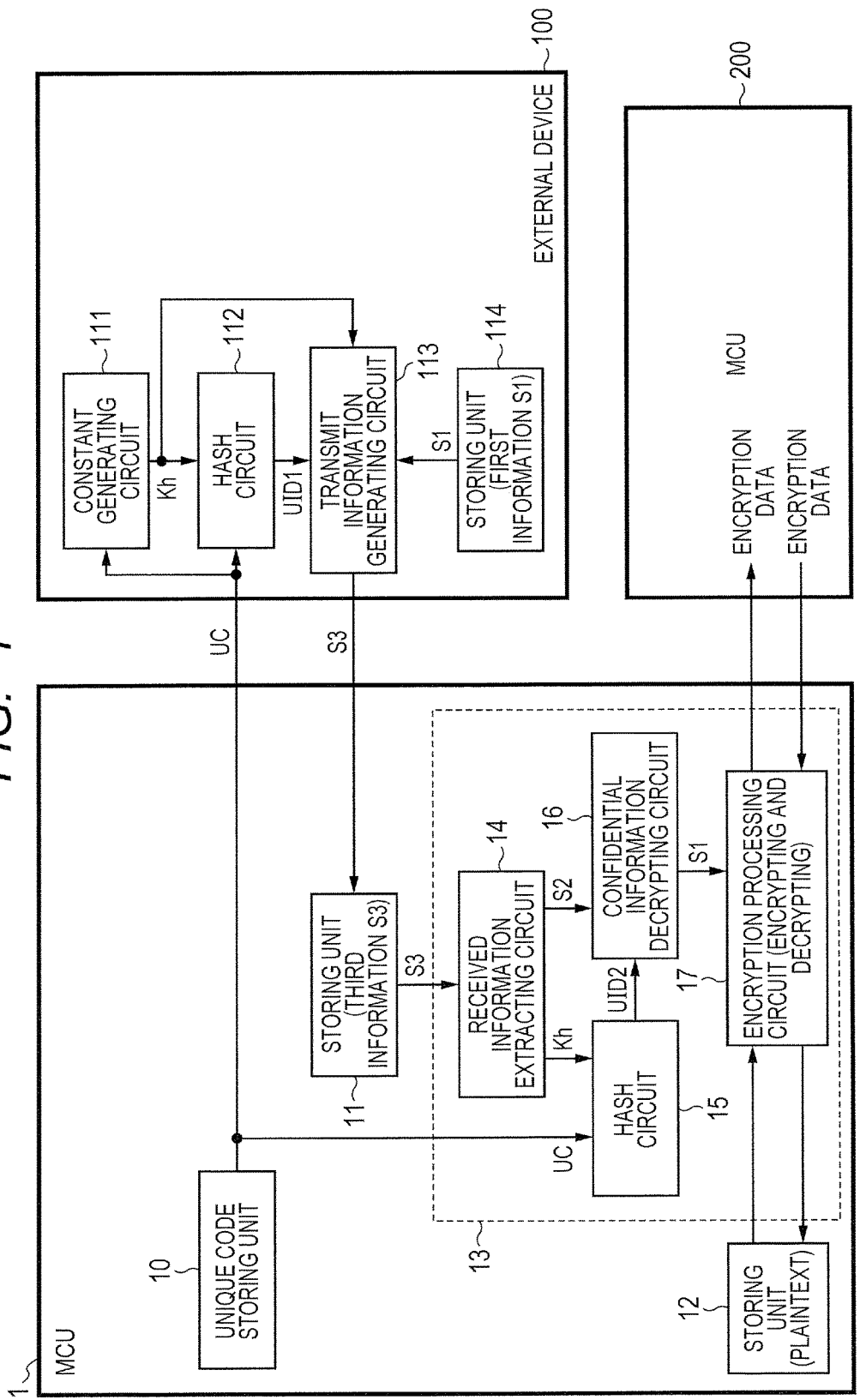
FIG. 1 is a block diagram illustrating an information processing system according to Embodiment 1.

As for the following descriptions and drawings, omission and simplification are suitably made for the clarification of explanation. Each element illustrated in the drawing as a functional block for performing various processing can be configured with a CPU, a memory, and other circuits as far as hardware goes, and can be realized by a program loaded to a memory as far as software goes. Therefore, it is needless to say that a person skilled in the art can understand that these functional blocks can be realized, in various forms, by hardware alone, software alone, or combination of them; accordingly, they are not restricted to either. In each drawing, the same symbol is attached to the same element and the repeated explanation thereof will be omitted if necessary.

The program mentioned above can be stored in non-transitory computer readable media of various types, and can be provided to a computer. The non-transitory computer readable medium includes tangible storage media of various types. The examples of the non-transitory computer readable medium include a magnetic recording medium (for example, a flexible disk, a magnetic tape, a hard disk drive), an optical magnetic recording medium (for example, a magneto-optic disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory)). It is also preferable that the program may be provided to a computer by means of transitory computer readable media of various types. The example of the transitory computer readable medium includes an electrical signal, a light signal, and electromagnetic waves. The transitory computer readable medium can provide a program to a computer through a wired communication path of an electric wire, an optical fiber, etc., or through a wireless communication path.

Embodiment 1

Hereinafter, the embodiments of the present invention are explained with reference to drawings. First, as one of the features, in an information processing system according to the embodiments, first information (for example, confidential information) which requires leakage prevention is stored in one device and the confidential information concerned is transmitted from the one device to another device. A semiconductor device according to the embodiments is configured so as to improve the responsiveness of an operation using the first information provided from another device (for example, an external device). Such a feature of the semiconductor device and the information processing system according to the embodiments can be utilized for various applications. However, as an example of the embodiments, the following explains a system configured with an external device which has first information (for example, a secret key), a first semiconductor device to which the secret key is written by the external device concerned, and a second semiconductor device which performs encryption communication (e.g., encrypted communication) employing the secret key with the first semiconductor device.

FIG. 1 is a block diagram illustrating an information processing system according to Embodiment 1. As illustrated in FIG. 1, the information processing system according to Embodiment 1 is configured with first and second semiconductor devices 1 and 200 and an external device 100. The external device 100 is a device such as a computer, and manages first information S1 (for example, confidential information or a secret key) to be provided to the first semiconductor device 1. The external device 100 is also configured with an interface which enables communication with the first semiconductor device 1. The first semiconductor device 1 performs encrypted communication with the second semiconductor device 200 through the use of the first information S1 provided. The first and second semiconductor devices 1 and 200 are MCUs (Micro Computing Units) which are mounted with an arithmetic circuit, a timer utilized by the arithmetic circuit concerned, an analog-to-digital converter circuit, a communication interface, a peripheral circuit such as a nonvolatile memory, and others, for example. Since the arithmetic circuit and others mounted in the first semiconductor device 1 are not characteristic portions, they are not shown in FIG. 1. The second semiconductor device 200 is substantially the same as the first semiconductor device 1 and has the first information S1 already stored, with regard to the encrypted communication function; therefore, detailed description of the second semiconductor device 200 is omitted.

The first semiconductor device 1 is configured with a unique code storing unit 10, a received information storing unit (for example, a storing unit 11), a data storing unit (for example, a storing unit 12), and an encryption circuit 13. The unique code storing unit 10 stores a unique code UC which is a value unique to the first semiconductor device 1. The unique code storing unit 10 is a nonvolatile memory such as a flash memory and EEPROM, for example. In the first semiconductor device 1 according to Embodiment 1, it is assumed that the unique code UC has a value set up in advance and does not include a random error in the normal state. The received information storing unit 11 and the data storing unit 12 are nonvolatile memories, such as a flash memory, an MRAM, and a ReRAM, for example. They are depicted separately in FIG. 1 for the convenience of explanation; however, it is not necessary that they be physically separate elements.

The received information storing unit 11 stores third information S3 outputted from the external device 100. The third information S3 is generated by the external device 100 and includes at least second information obtained by encrypting the first information stored in the external device with the use of external device unique information which has been generated from the unique code UC (e.g., encrypted key information). The received information storing unit 11 is a rewritable nonvolatile memory, for example.

The data storing unit 12 stores data serving as a communication object in communicating with the second semiconductor device 200. The data storing unit 12 is a rewritable memory.

The encryption circuit 13 recovers the first information S1 (for example, a secret key) through the use of the third information S3 stored in the received information storing unit 11 and the unique code UC stored in the unique code storing unit 10, and outputs first encryption data (also referred to as "first encrypted data") obtained by encrypting plaintext data stored in data storing unit 12 with the use of the first information S1, to the second semiconductor device 200. The encryption circuit 13 receives second encryption data (also referred to as "second encrypted data") from the second semiconductor device 200, decrypts the second encrypted data concerned with the use of the first information S1, generates plaintext data, and stores it in the data storing unit 12. The encryption circuit 13 is configured with a received information extracting circuit 14, a unique information generating circuit (for example, a first hash circuit 15), a decrypting circuit (for example, a confidential information decrypting circuit 16), and an encryption processing circuit 17. For the convenience of explanation, the received information extracting circuit 14, the first hash circuit 15, the confidential information decrypting circuit 16, and the encryption processing circuit 17 are described as separated circuits as in the above. However, it is possible to obtain the same effect even when the circuits described above are employed in common in order to perform the encryption processing.

In Embodiment 1, the third information S3 includes the second information S2 and a hash constant Kh. More specifically, the third information S3 is obtained by scrambling the second information S2 with the hash constant Kh, thus creating scrambled encrypted key information. The hash constant Kh is a hash value which is calculated by the external device 100 with the use of the unique code UC read from the unique code storing unit 10.

The received information extracting circuit 14 extracts the hash constant Kh and the second information S2 from the third information S3 stored in the received information storing unit 11. More specifically, the received information extracting circuit 14 descrambles the third information S3 to generate the second information S2 and the hash constant Kh.

The first hash circuit 15 is a unique information generating circuit, and generates principal device unique information UID2 with the use of the unique code UC. More specifically, the first hash circuit 15 inputs the unique code UC and the hash constant Kh outputted by the received information extracting circuit 14, calculates a hash value of these input values, and outputs the hash value as the principal device unique information UID2. The unique information generating circuit may generate the principal device unique information UID2 according to other algorithms, in addition to the hash circuit which calculates the hash value. The first hash circuit 15 is called the principal unique information generating circuit in some cases.

The confidential information decrypting circuit 16 decrypts the second information S2 outputted by the received information extracting circuit 14, with the use of the principal device unique information UID2, and recovers the first information S1. In Embodiment 1, the external device 100 generates the second information S2 by encrypting the first information S1 with the use of the external device unique information UID1 generated by the same algorithm as employed in the first hash circuit 15. Accordingly, when the external device unique information UID1 and the principal device unique information UID2 are different in value, the first information S1 recovered by the confidential information decrypting circuit 16 and the first information S1 stored in the external device 100 become different in value.

The encryption processing circuit 17 performs encrypting to communication object information (for example, plaintext data) with the use of the first information S1, and outputs first encrypted data. The encryption processing circuit 17 also performs decrypting to the received second encrypted data from the second semiconductor device 200, and outputs plaintext data. In addition, it is also possible for the encryption processing circuit 17 to decrypt the information encrypted and stored in the data storing unit 12, and to execute it inside its own equipment (for example, the semiconductor device 1).

The external device 100 is configured with a constant generating circuit 111, an external hash circuit 112, a transmit information generating circuit 113, and an external storing unit 114.

The constant generating circuit 111 generates a constant having a value corresponding to the unique code UC. In Embodiment 1, the constant generating circuit 111 outputs the hash value of the unique code UC as a constant (hereinafter called a hash constant Kh).

The external hash circuit 112 is a unique information generating circuit. The external hash circuit 112 acquires the unique code UC from the semiconductor device and generates the external device unique information UID1 from the unique code UC. In Embodiment 1, the external hash circuit 112 generates the external device unique information UID1 with the use of the hash constant Kh and the unique code UC. The external hash circuit 112 receives, as input, the hash constant Kh and the unique code UC, and outputs the hash value corresponding to these input values as the external device unique information UID1. The external hash circuit 112 is called the external unique information generating circuit in some cases.

The transmit information generating circuit 113 generates third information S3 including at least the second information S2 obtained by encrypting the first information S1 with the use of the external device unique information UID1. It is understood that the second information S2 is created internally in the transmit information generating circuit 113. In Embodiment 1, the transmit information generating circuit 113 generates the third information S3 which includes the second information S2 and the hash constant Kh. The transmit information generating circuit 113 generates the third information S3 by scrambling the second information S2 with the hash constant Kh.

The external storing unit 114 stores the first information S1. When utilizing a computer for example as the external device 100, it is possible to realize the external storing unit 114 by a nonvolatile memory such as a hard disk and a flash memory. When utilizing a computer for example as the external device 100, it is also possible to realize the constant generating circuit 111, the external hash circuit 112, and the transmit information generating circuit 113 by an arithmetic circuit which executes a predetermined program. A so-called server may be utilized as the external device 100. In that case, it is possible to realize those circuits by software which has the function described above.

Next, operation of the information processing system according to Embodiment 1 is explained. The information processing system according to Embodiment 1 includes a write step at which an encrypted and scrambled version of the first information S1 (in the form of the third information S3) is provided to the first semiconductor device 1 from the external device 100, and an actual encrypted data operation step at which the encrypted communication is performed between the first semiconductor device 1 and the second semiconductor device 200. Accordingly, the following explains the operation of the write step and the actual encrypted data operation step, separately.

Figure 2:
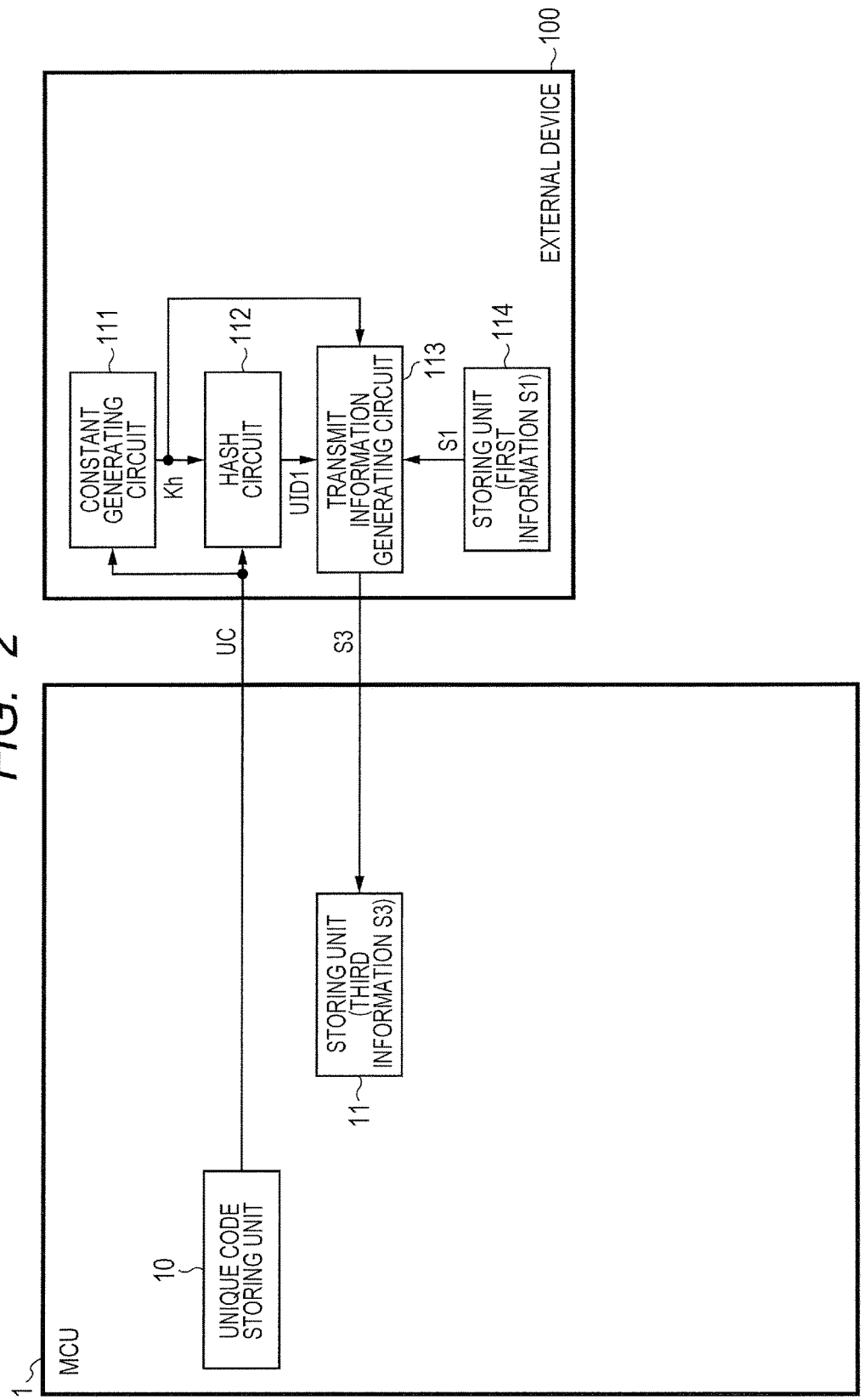
FIG. 2 is a block diagram illustrating a portion utilized at the time of write of first information in the information processing system according to Embodiment 1.

FIG. 2 is a block diagram illustrating a portion utilized by the processing at the write step of the information processing system according to Embodiment 1. As illustrated in FIG. 2, at the write step, the unique code storing unit 10 and the received information storing unit 11 of the first semiconductor device 1 are utilized, and the constant generating circuit 111, the external hash circuit 112, the transmit information generating circuit 113, and the external storing unit 114 of the external device 100 are utilized.

Figure 3:
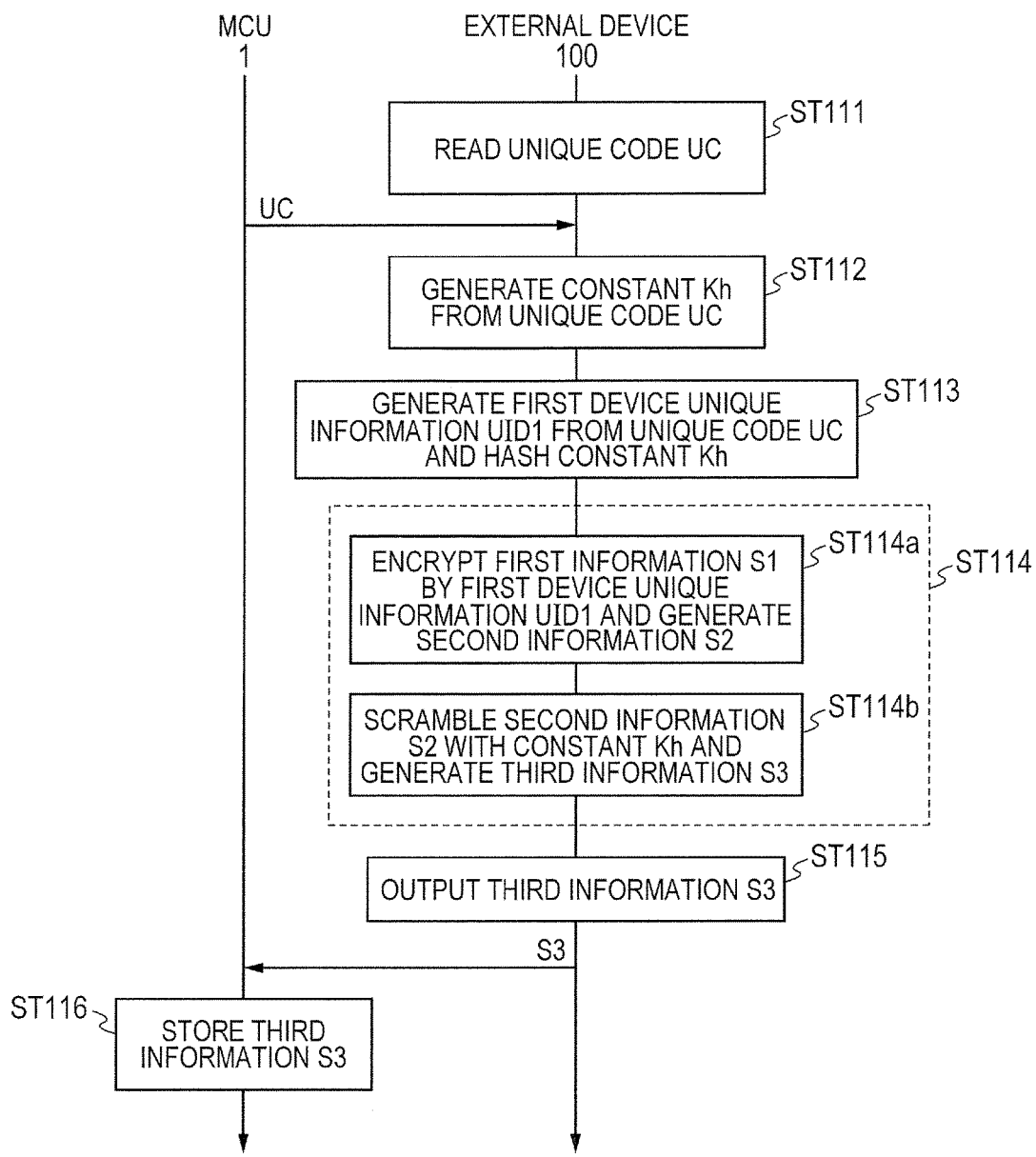
FIG. 3 is a sequence diagram illustrating operation at the time of write of the first information in the information processing system according to Embodiment 1.

Here, operation of the write step of the information processing system according to Embodiment 1 is explained. FIG. 3 is a sequence diagram illustrating operation of the information processing system according to Embodiment 1. As illustrated in FIG. 3, in the information processing system according to Embodiment 1, at first, the external device 100 reads the unique code UC from the first semiconductor device 1 (Step ST111). Accordingly, the unique code UC is transmitted to the external device 100 from the first semiconductor device 1. In the communication between the external device 100 and the first semiconductor device 1, it is also preferable to perform a mutual authentication step.

Next, the information processing system according to Embodiment 1 generates the hash constant Kh from the unique code UC by utilizing the constant generating circuit 111 (Step ST112). Next, the external hash circuit 112 generates the external device unique information UID1 with the use of the unique code UC and the hash constant Kh (Step ST113). Next, the external device 100 generates the third information S3 by utilizing the transmit information generating circuit 113 (Step ST114). The step which generates the third information S3 includes two steps. More specifically, the transmit information generating circuit 113 encrypts the first information S1 with the external device unique information UID1, to generate the second information S2 (Step ST114a). Next, the transmit information generating circuit 113 performs scrambling for example to the second information S2 with the use of the hash constant Kh, to generate the third information S3 (Step ST114b). Then, the transmit information generating circuit 113 outputs the third information S3 (Step ST115), and the first semiconductor device 1 stores the received third information S3 into the received information storing unit 11 (Step ST116).

Figure 4:
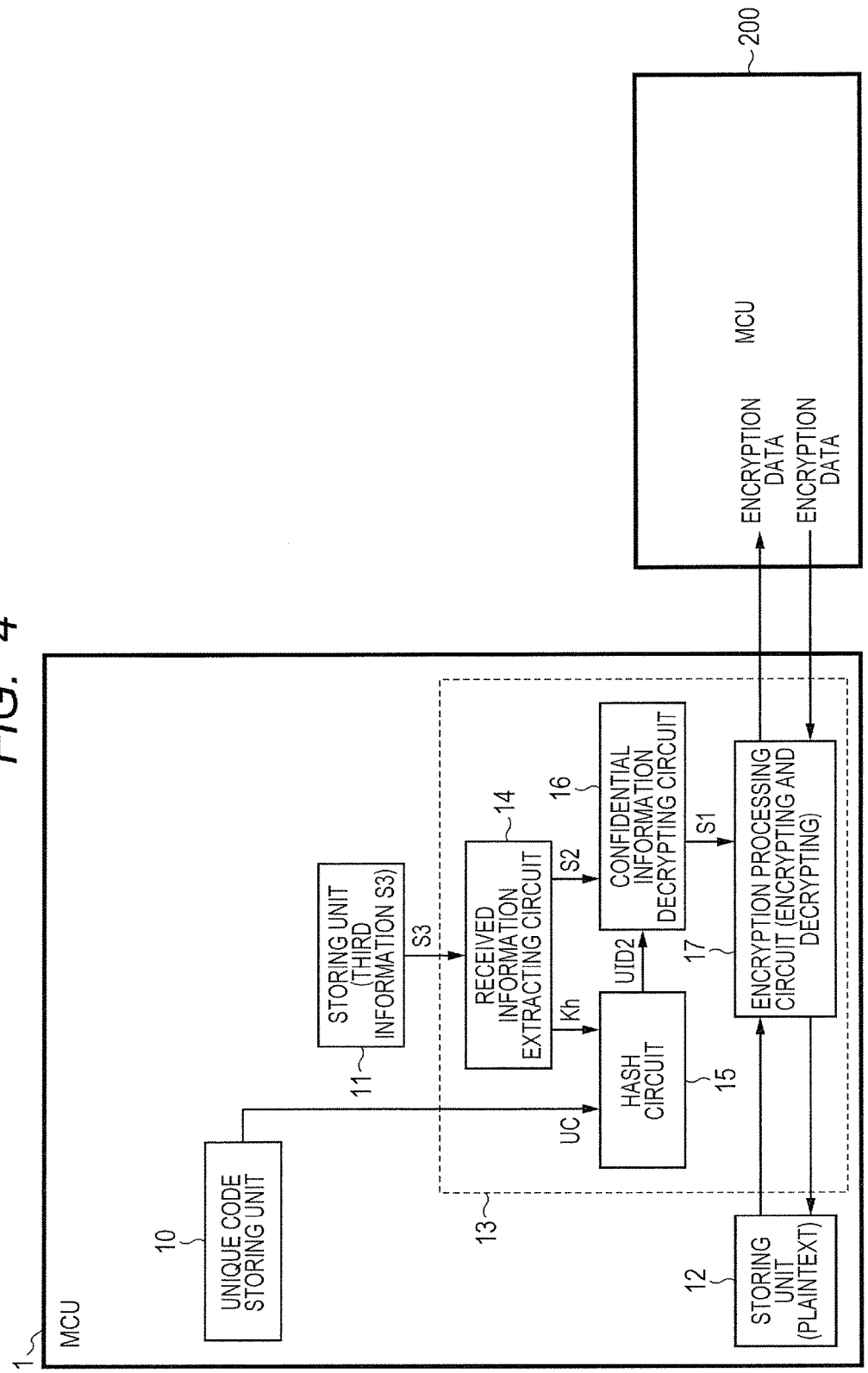
FIG. 4 is a block diagram illustrating a portion utilized in performing encryption communication using the first information in the information processing system according to Embodiment 1.

Next, FIG. 4 is a block diagram illustrating a portion utilized by the processing at the actual encrypted data operation step of the information processing system according to Embodiment 1. As illustrated in FIG. 4, at the actual encrypted data operation step, the unique code storing unit 10, the received information storing unit 11, the data storing unit 12, and the encryption circuit 13 of the first semiconductor device 1 are utilized, and the first semiconductor device 1 and the second semiconductor device 200 transmit and receive the encrypted data. At the actual operation step, the external device 100 is not used and accordingly it is not shown.

Figure 5:
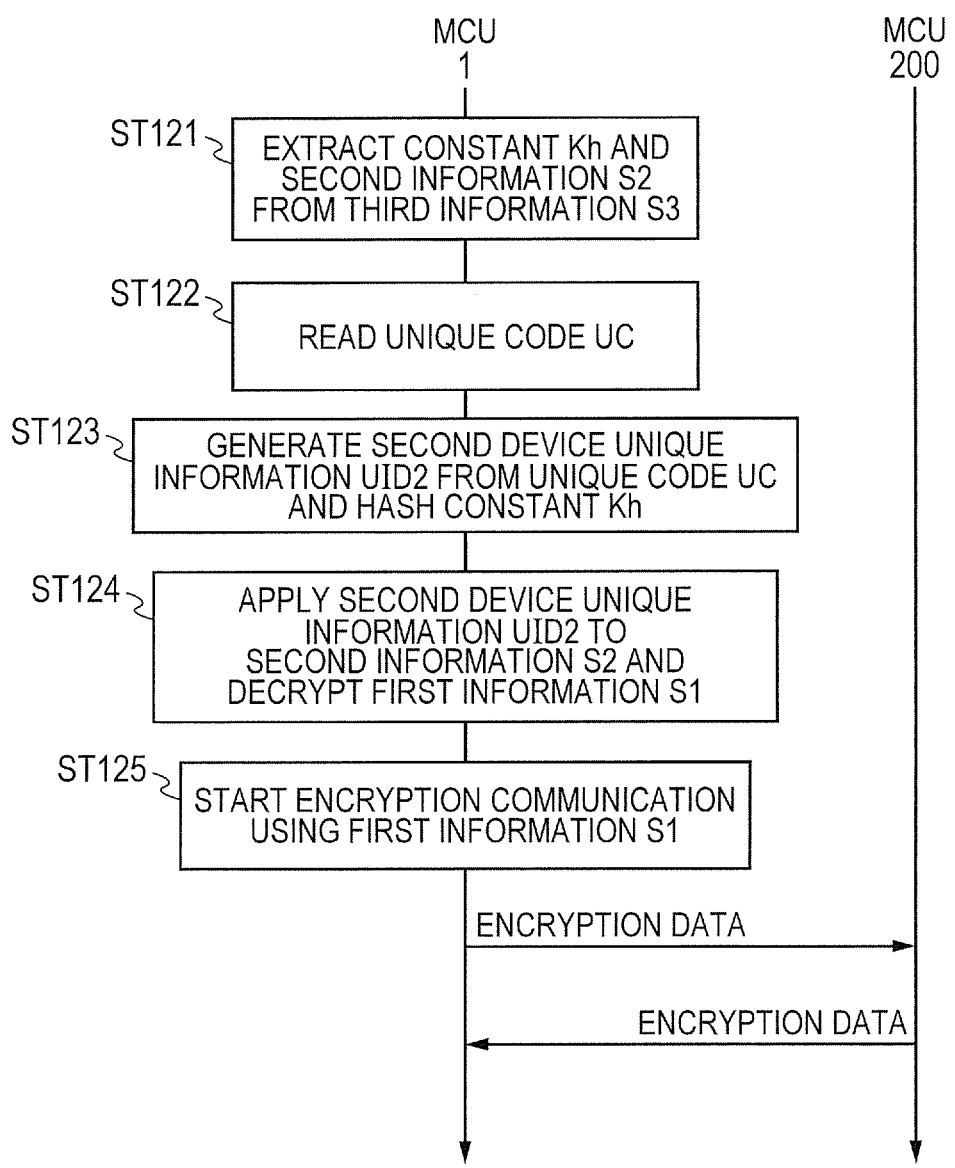
FIG. 5 is a sequence diagram illustrating operation in performing encryption communication using the first information in the information processing system according to Embodiment 1.

Here, operation of the actual encrypted data operation step of the information processing system according to Embodiment 1 is explained. FIG. 5 is a sequence diagram illustrating operation of the information processing system according to Embodiment 1. As illustrated in FIG. 5, at the start of the actual encrypted data operation, the first semiconductor device 1 according to Embodiment 1 first extracts the hash constant Kh and the second information S2 from the third information S3 stored in the received information storing unit 11, by utilizing the received information extracting circuit 14 (Step ST121). Next, the first semiconductor device 1 reads the unique code UC from the unique code storing unit 10 (Step ST122). Next, the first semiconductor device 1 generates the principal device unique information UID2 from the unique code UC and the hash constant Kh by utilizing the first hash circuit 15 (Step ST123). Next, the first semiconductor device 1 decrypts the second information S2 with the principal device unique information UID2 by utilizing the confidential information decrypting circuit 16 and recovers the first information S1 (Step ST124). Then, in the first semiconductor device 1, the encryption processing circuit 17 starts the encrypted communication with the use of the first information S1 (Step ST125).

As seen from the above explanation, the first semiconductor device 1 according to Embodiment 1 stores the third information S3 including the second information S2 obtained by encrypting the first information S1 with the use of the external device unique information UID1 which is generated from the unique code UC of the first semiconductor device 1. Accordingly, the first semiconductor device 1 can generate the principal device unique information UID2 which has the same value as the external device unique information UID1 generated by the external device 100 from the unique code UC stored in its own equipment (e.g., in the unique code storing unit 10), and can decrypt the second information S2 to generate the first information S1.

In the related art technology, the security level has been improved by employing the PUF which includes a random error at each reading, in the generation processing of the device unique information, and by not keeping inside the semiconductor device the secret information (for example, a secret key) which should be considered to be confidential when performing encrypted communication. Therefore, in the related art technology, when the sufficient error correction of the read PUF cannot be performed, re-reading is required, leading to deterioration of the responsiveness. On the other hand, in the first semiconductor device 1 according to Embodiment 1, the principal device unique information UID2 can be generated from the unique code UC by arithmetic operation, and the first information S1 can be obtained with the use of the principal device unique information UID2 concerned. Therefore, the first semiconductor device 1 can employ an error-free value as the unique code UC employed for generation of the device unique information UID. Since the unique code UC does not include an error, re-reading due to the read error is not necessary for the first semiconductor device 1, leading to a high responsiveness. Accordingly, it is possible to realize the system which keeps confidential information safely.

In the information processing system according to Embodiment 1, the external device 100 generates the hash constant Kh and the external device unique information UID1 on the basis of the unique code UC acquired from the first semiconductor device 1. The external device 100 generates the third information S3 including the hash constant Kh and the second information S2 obtained by encrypting the first information S1 with the use of the external device unique information UID1. Accordingly, in the information processing system according to Embodiment 1, even if the data transmitted and received between the first semiconductor device 1 and the external device 100 is analyzed and the third information S3 and the unique code UC are acquired, it is possible to prevent the first information S1 from being analyzed from these pieces of data, and accordingly it is possible to prevent the first information S1 from being leaked. That is, in the information processing system according to Embodiment 1, it is possible to enhance the responsiveness of the first semiconductor device 1, and at the same time, it is possible to realize the communication path between the first semiconductor device 1 and the external device 100 having the security level as high as the security level in the case where the PUF is employed as the unique code.

In the first semiconductor device 1 according to Embodiment 1, the third information S3 stored in the received information storing unit 11 includes the second information S2 obtained by encrypting the first information S1 as the secrecy object. Accordingly, in the first semiconductor device 1 according to Embodiment 1, even if the third information S3 stored in the received information storing unit 11 and the unique code UC stored in the unique code storing unit 10 are acquired, it is not possible to know the first information S1 only from the acquired pieces of information. That is, by employing the first semiconductor device 1 according to Embodiment 1, it is possible to prevent the leakage of the first information S1 stored in the external device 101, and at the same time, it is possible to enhance the responsiveness of the first semiconductor device 1.

In the first semiconductor device 1 according to Embodiment 1, it is possible to obtain a high responsiveness in generating the first information S1; therefore, it is also possible to generate the first information S1 every time encrypted communication is performed. In this way, by generating the first information S1 intermittently, it is possible to reduce the period during which the first information S1 is outputted, leading to further improvement of the security level of the first information S1.

Embodiment 2

Figure 6:
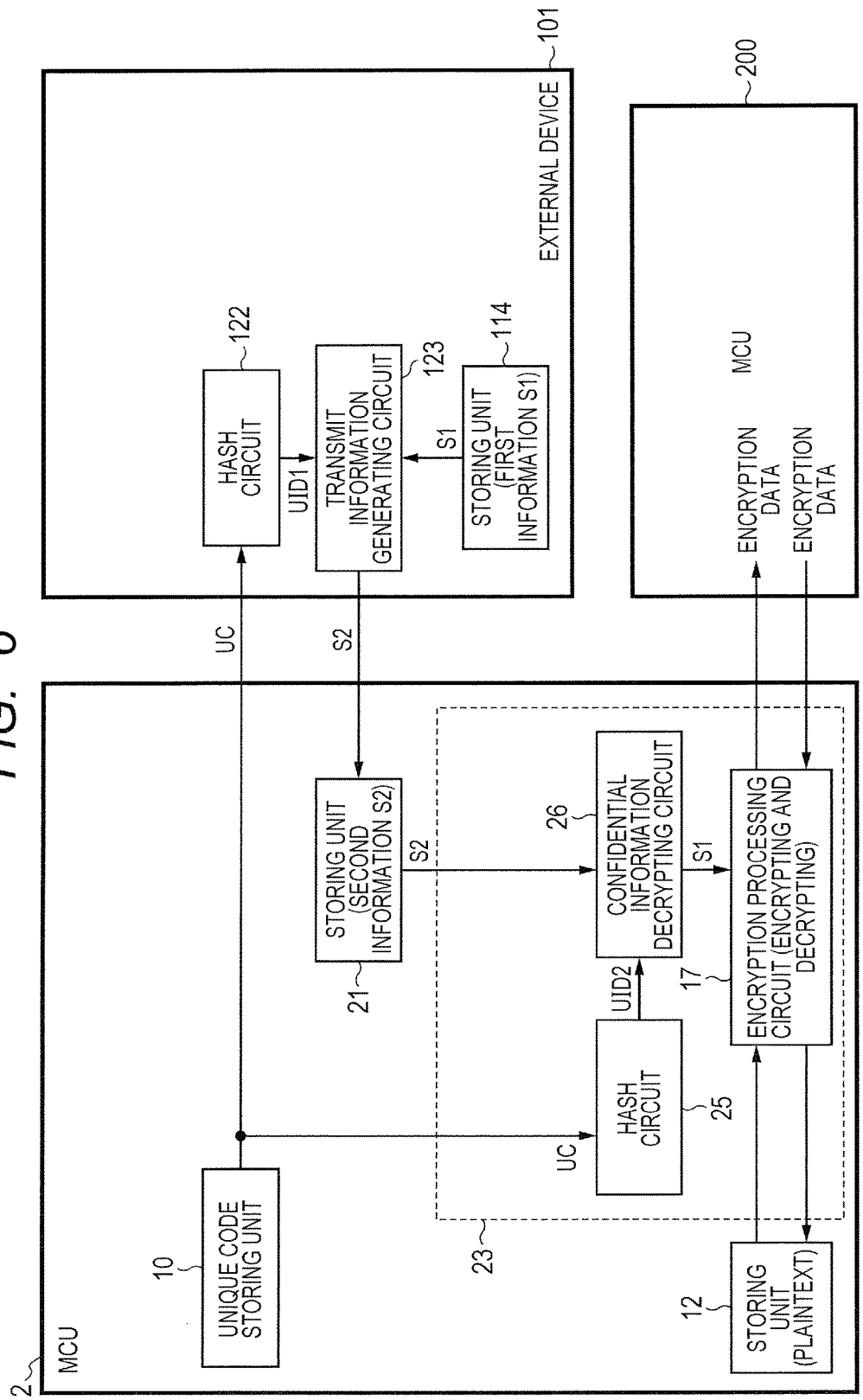
FIG. 6 is a block diagram illustrating an information processing system according to Embodiment 2.

FIG. 6 is a block diagram illustrating an information processing system according to Embodiment 2. As illustrated in FIG. 6, the information processing system according to Embodiment 2 is configured with a first semiconductor device 2 which has reduced functions compared to the first semiconductor device 1, and an external device 101 which has reduced functions compared to the external device 100. The information processing system according to Embodiment 2 employs the second information S2 as it is, without creating or using the hash value Kh created by the constant generating circuit 111 to create the third information S3, as seen in FIGS. 1 and 2 in connection with the first embodiment. Accordingly, FIG. 6 shows the second information S2 in lieu of the third information S3. In the explanation of Embodiment 2, the same reference symbol as in Embodiment 1 is attached to the same component as in Embodiment 1, and the detailed explanation thereof is omitted.

As illustrated in FIG. 6, the first semiconductor device 2 is configured with a received information storing unit 21 and an encryption circuit 23 in lieu of the received information storing unit 11 and the encryption circuit 13. The received information storing unit 21 stores the second information S2 outputted by the external device 101. The encryption circuit 23 is equivalent to the encryption circuit 13 in which the received information extracting circuit 14 is removed and the first hash circuit 15 and the confidential information decrypting circuit 16 are replaced with a first hash circuit 25 and a confidential information decrypting circuit 26. Thus, in the second embodiment, there is no need for the received information extracting circuit 14 of the first embodiment, since the external device 101 outputs the second information S2.

The first hash circuit 25 is a principal unique information generating circuit, and generates principal device unique information UID2 with the use of the unique code UC. The first hash circuit 25 outputs a hash value corresponding to the unique code UC as the principal device unique information UID2.

The confidential information decrypting circuit 26 acquires the second information S2 directly from the received information storing unit 21 without the second information S2 first having to be extracted from scrambled encrypted key information, such as the third information S3, as is done in the first embodiment. The confidential information decrypting circuit 26 also acquires the principal device unique information UID2 from the principal unique information generating circuit 25. Then, the confidential information decrypting circuit 26 decrypts the second information S2 using only the principal device unique information UID2 to recover the first information S1.

Figure 7:
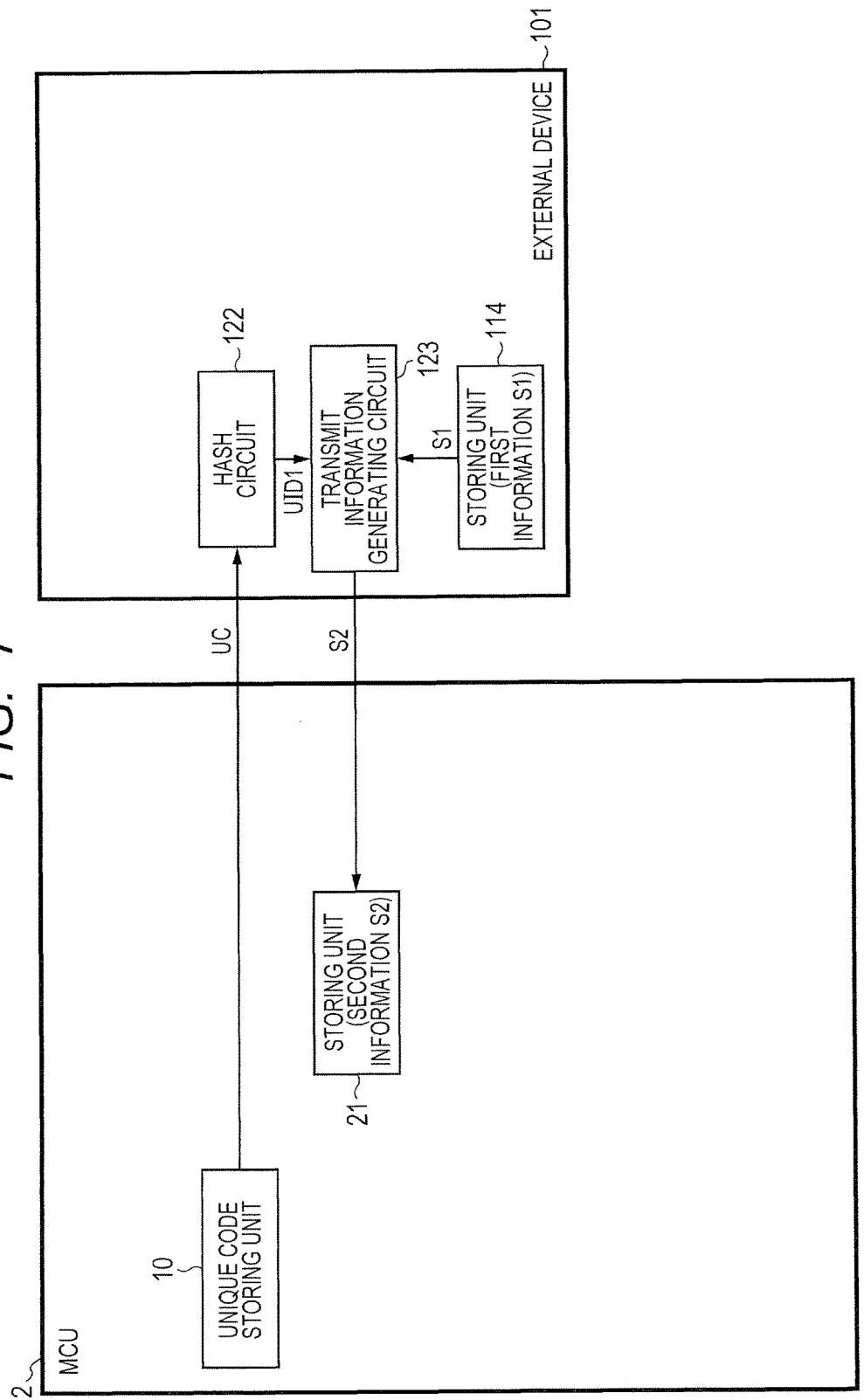
FIG. 7 is a block diagram illustrating a portion utilized at the time of write of first information in the information processing system according to Embodiment 2.

As illustrated in FIGS. 6 and 7, the external device 101 is similar to the external device 100. However, the external device 101 is devoid of the constant generating circuit 111 seen in Embodiment 1, and the external hash circuit 112 and the transmit information generating circuit 113 are replaced with an external hash circuit 122 and a transmit information generating circuit 123.

The external hash circuit 122 acquires the unique code UC from the semiconductor device 2, and generates the external device unique information UID1 solely on the basis of the acquired unique code UC. Specifically, since the external device 101 is devoid of the constant generating circuit 111 seen in the Embodiment 1, the external hash circuit 122 creates the external device unique information UID1 without the input of a hash constant Kh, such as generated by the constant generating circuit 111, as seen in FIGS. 1 and 2 of Embodiment 1. Thus, the external hash circuit 122 outputs a hash value of the unique code UC as the external device unique information UID1, based solely on the unique code UC. The transmit information generating circuit 123 encrypts the first information S1 stored in the external storing unit 114 with the use of the external device unique information UID1 alone, to output the second information S2. Specifically, since the external device 101 is devoid of the constant generating circuit 111 seen in the Embodiment 1, the transmit information generating circuit 123 encrypts the first information S1 using the external device unique information UID1, and without the input of a hash constant Kh.

Next, operation of the information processing system according to Embodiment 2 is explained. As is the case with the information processing system according to Embodiment 1, the information processing system according to Embodiment 2 includes a write step at which an encrypted version of the first information S1 (in the form of second information S2) is provided to the first semiconductor device 2 from the external device 101, and an actual encrypted data operation step at which encrypted communication is performed between the first semiconductor device 2 and the second semiconductor device 200. Accordingly, the following explains the operation of the write step and the actual encrypted data operation step, separately.

FIG. 7 is a block diagram illustrating a portion utilized by the processing at the write step of the information processing system according to Embodiment 2. As illustrated in FIG. 7, at the write step, the unique code storing unit 10 and the received information storing unit 21 of the first semiconductor device 2 are utilized, and the external hash circuit 122, the transmit information generating circuit 123, and the external storing unit 114 of the external device 101 are utilized.

Figure 8:
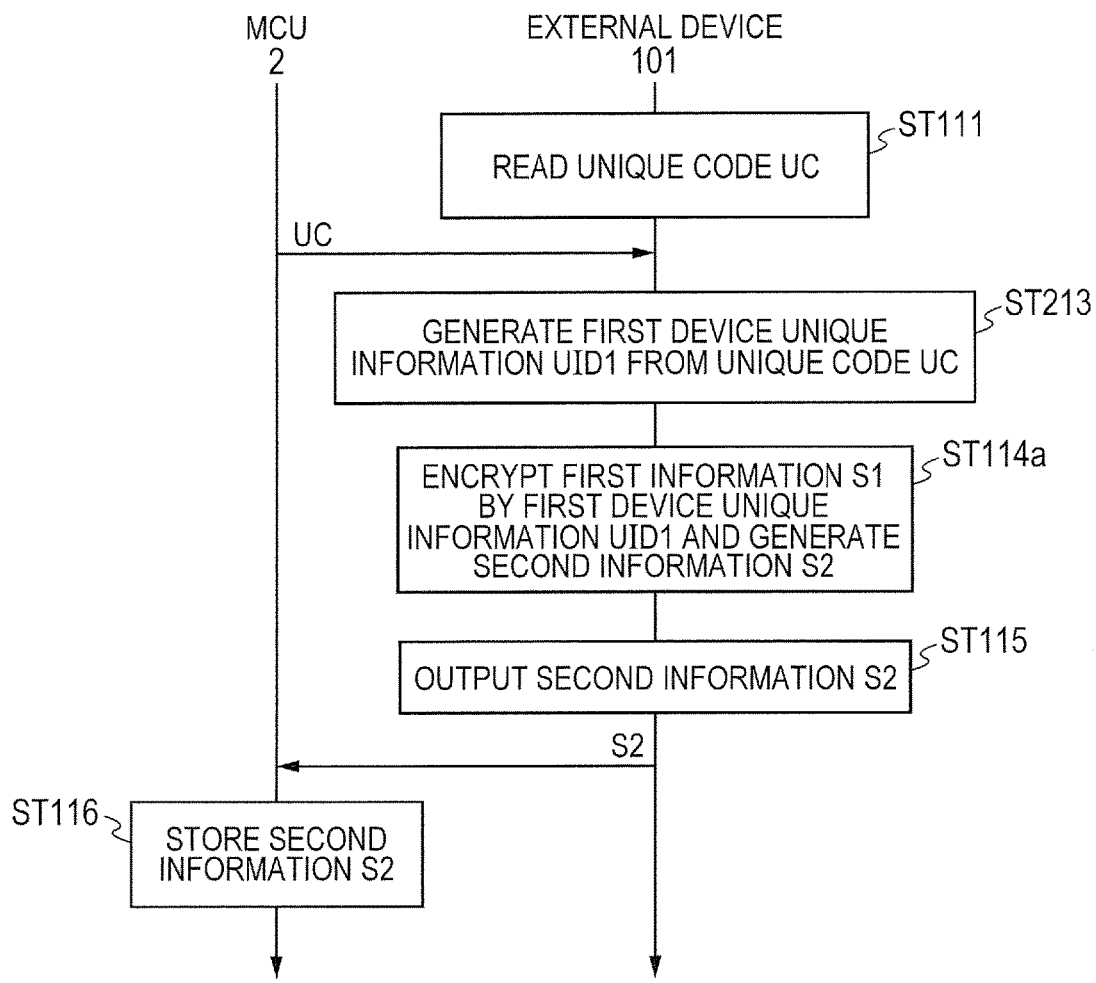
FIG. 8 is a sequence diagram illustrating operation at the time of write of the first information in the information processing system according to Embodiment 2.

Here, operation of the write step of the information processing system according to Embodiment 2 is explained. FIG. 8 is a sequence diagram illustrating operation of the information processing system according to Embodiment 2. As illustrated in FIG. 8, in the information processing system according to Embodiment 2, at first, the external device 101 reads the unique code UC from the first semiconductor device 2 (Step ST111). Accordingly, the unique code UC is transmitted to the external device 101 from the first semiconductor device 2.

Next, in the information processing system according to Embodiment 2, the external hash circuit 122 generates the external device unique information UID1 with the use of the unique code UC (Step ST213) alone, and specifically, without the input of a hash constant Kh. Next, in the external device 101, the transmit information generating circuit 123 encrypts the first information S1 with the external device unique information UID1, to generate the second information S2 (Step ST114a), again without the input of a hash constant Kh. Then, the transmit information generating circuit 123 outputs the second information S2 (Step ST115), and the first semiconductor device 2 stores the received second information S2 in the received information storing unit 21 (Step ST116).

Figure 9:
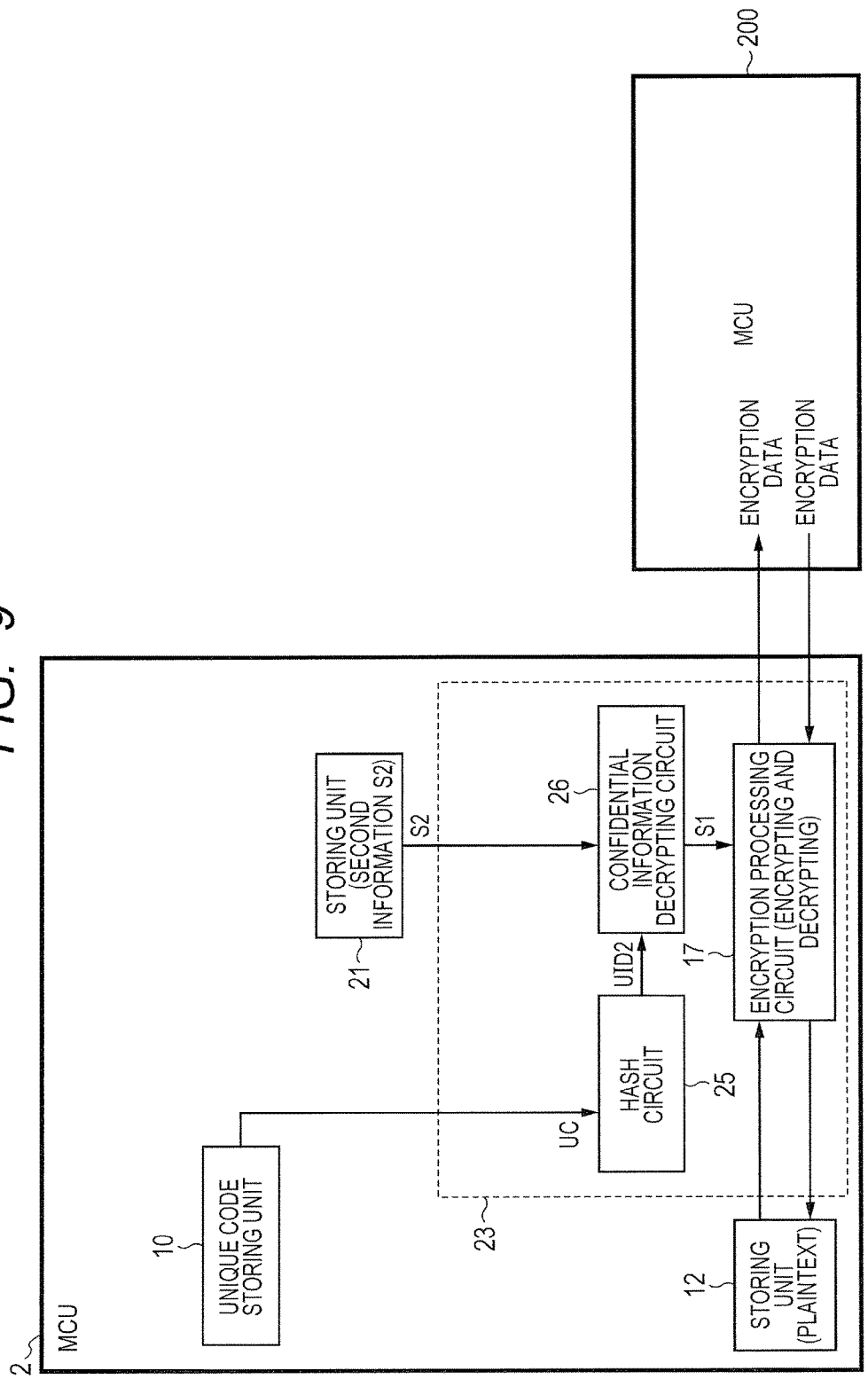
FIG. 9 is a block diagram illustrating a portion utilized in performing encryption communication using the first information in the information processing system according to Embodiment 2.

Next, FIG. 9 is a block diagram illustrating a portion utilized by the processing at the actual encrypted data operation step of the information processing system according to Embodiment 2. As illustrated in FIG. 9, at the actual encrypted data operation step, the unique code storing unit 10, the received information storing unit 21, the data storing unit 12, and the encryption circuit 23 of the first semiconductor device 2 are utilized, and the first semiconductor device 2 and the second semiconductor device 200 transmit and receive the encrypted data. At the actual encrypted data operation step, the external device 101 is not used and accordingly it is not shown.

Figure 10:
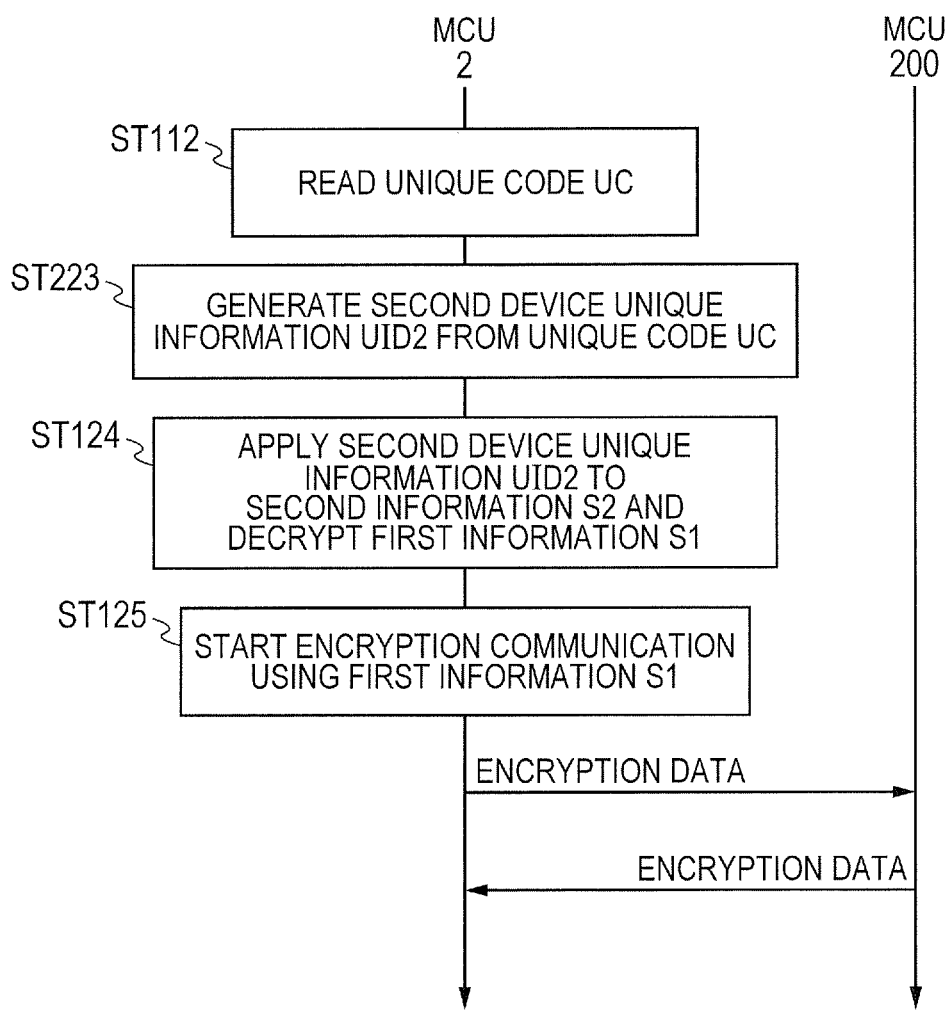
FIG. 10 is a sequence diagram illustrating operation in performing encryption communication using the first information in the information processing system according to Embodiment 2.

Here, operation of the actual operation step of the information processing system according to Embodiment 2 is explained. FIG. 10 is a sequence diagram illustrating operation of the information processing system according to Embodiment 2. As illustrated in FIG. 10, at the start of the actual encrypted data operation, the first semiconductor device 2 according to Embodiment 2 first reads the unique code UC from the unique code storing unit 10 (Step ST112). Next, the first semiconductor device 2 generates the principal device unique information UID2 from the unique code UC by utilizing the first hash circuit 25 (Step ST223). Next, the first semiconductor device 2 decrypts the second information S2 by the principal device unique information UID2 by utilizing the confidential information decrypting circuit 26 and recovers the first information S1 (Step ST124). Then, in the semiconductor device 2, the encryption processing circuit 17 starts the encrypted communication with the use of the first information S1 (Step ST125).

As seen from the above explanation, according to Embodiment 2, the device unique information is directly generated from the unique code UC, without employing the hash constant Kh which is employed in Embodiment 1. Accordingly, in Embodiment 2, the received information extracting circuit 14 found in the first semiconductor device 1 and the constant generating circuit 111 found in the external circuit 100 (both of the Embodiment 1) are omitted. That is, the first semiconductor device 2 according to Embodiment 2 can reduce the circuit scale and the processing, compared with the first semiconductor device 1 according to Embodiment 1. The first semiconductor device 2 according to Embodiment 2 can enhance the responsiveness by reducing the processing, compared with the first semiconductor device 1 according to Embodiment 1. Also the external device 101 according to Embodiment 2 can reduce the circuit scale and the processing, compared with the external device 100 according to Embodiment 1.

Also in the information processing system according to Embodiment 2, the second information S2 is encrypted in communication between the first semiconductor device 2 and the external device 101 with the use of the external device unique information UID1 generated from the unique code UC. Therefore, it is possible to secure the security in the information processing system according to Embodiment 2. Also in the first semiconductor device 2 according to Embodiment 2, the first information S1 is received as the encrypted second information S2. Therefore, it is possible to ensure the security of the first information S1. The fundamental operation of the first semiconductor device 2 according to Embodiment 2 is nearly the same as that of the first semiconductor device 1 according to Embodiment 1. Therefore, in Embodiment 2, the other effects of the first semiconductor device 1 according to Embodiment 1 can be obtained as is the case with Embodiment 1.

Furthermore, unlike in Embodiments 3 and 4, discussed below, the first semiconductor device 2 according to Embodiment 2 may be devoid of both error correction circuitry and cyclic redundancy check circuitry configured to check the unique code (as is the case discussed below in connection with Embodiment 3), and the external device may be devoid of circuitry configured to determine validity of the external device unique information (as is the case discussed further below in connection with Embodiment 4).

Embodiment 3

Figure 11:
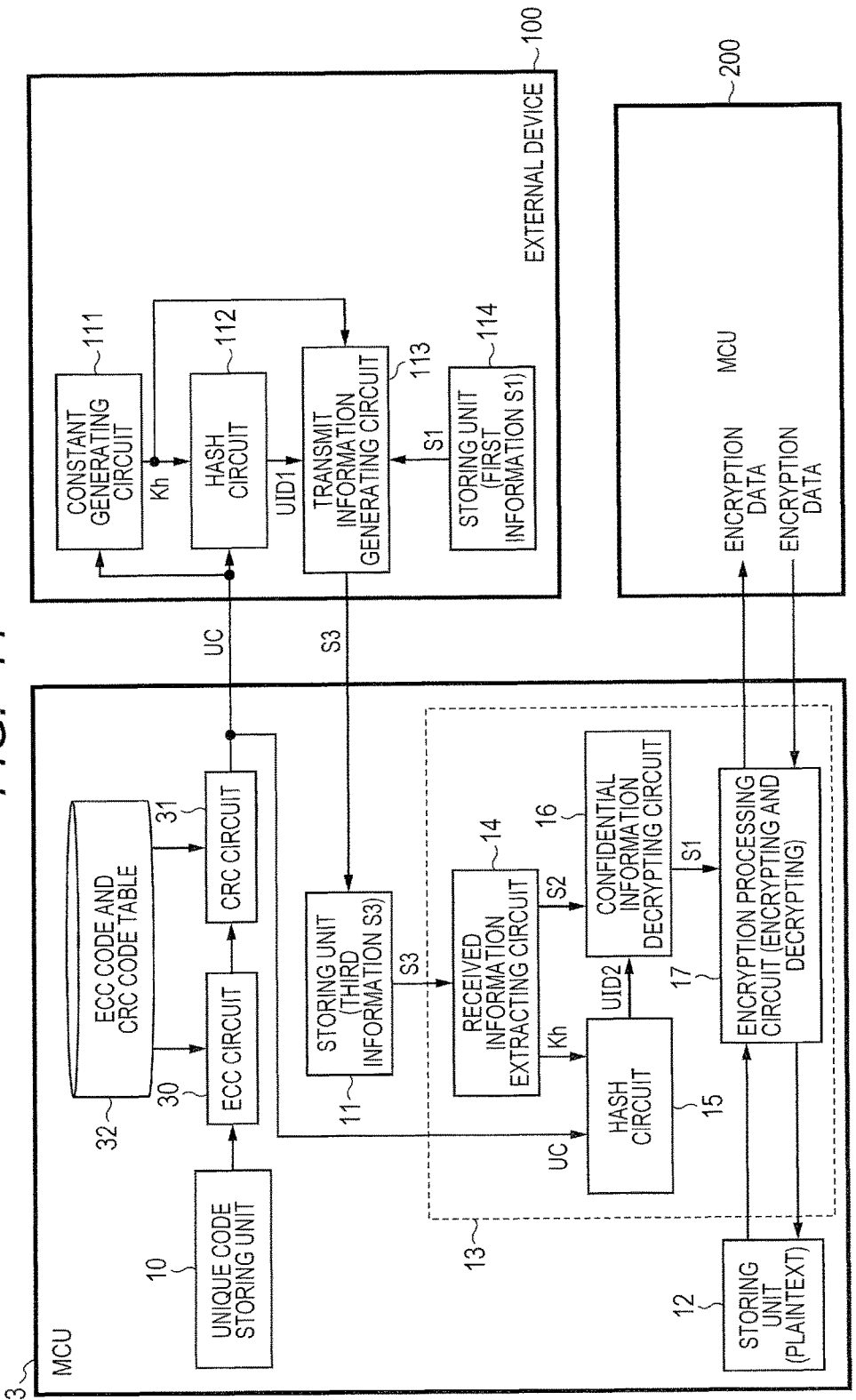
FIG. 11 is a block diagram illustrating an information processing system according to Embodiment 3.

FIG. 11 is a block diagram illustrating an information processing system according to Embodiment 3. As illustrated in FIG. 11, the information processing system according to Embodiment 3 is configured with a first semiconductor device 3 in lieu of the first semiconductor device 1. The first semiconductor device 3 is similar to the first semiconductor device 1 according to Embodiment 1, However, in the system according to Embodiment 3, the first semiconductor device 3 includes a first ECC (Error-Correction Code) circuit 30, a first CRC (Cyclic Redundancy Check) circuit 31, and a correction storing unit 32. In the explanation of Embodiment 3, the same reference symbols used in Embodiment 1 are attached to the same components, and the detailed explanation thereof is omitted.

The first ECC circuit 30 is an error correction circuit and performs error correcting on the unique code UC. More specifically, the first ECC circuit 30 performs error correcting of the unique code UC with the use of the ECC code stored in the correction storing unit 32.

The first CRC circuit 31 is an error detection circuit and performs error detecting on the unique code UC. More specifically, the first CRC circuit 31 detects an error of the unique code UC with reference to a CRC code table stored in the correction storing unit 32.

The first semiconductor device 3 illustrated in FIG. 11 presents an example in which the first CRC circuit 31 is provided in the latter stage of the first ECC circuit 30. However, the order of arrangement of the first ECC circuit 30 and the first CRC circuit 31 can be changed. It is also preferable to provide only one of the first ECC circuit 30 and the first CRC circuit 31.

When the error correction is performed, it is also preferable to make the first ECC circuit 30 hold an error correction result, for convenience of reference at the time of failure occurrence, for example. When an error is detected in the first CRC circuit 31, it is possible to stop the transmission of the unique code UC or it is possible to request to perform the same sequence again.

In the first semiconductor device 3 according to Embodiment 3, the first hash circuit 15 outputs the principal device unique information UID2, on the basis of the unique code UC to which an error correction and error detection have been performed through the first ECC circuit 30 and the first CRC circuit 31. In the information processing system according to Embodiment 3, the external device 100 receives the unique code UC on which the error correction and the error detection have been performed through the first ECC circuit 30 and the first CRC circuit 31, and generates the hash constant Kh and the external device unique information UID1 on the basis of the unique code UC concerned, as described above in connection with Embodiment 1.

Next, operation of the information processing system according to Embodiment 3 is explained. The information processing system according to Embodiment 3 has a write step and an actual encrypted data operation step, as is the case with Embodiment 1. Accordingly, also in Embodiment 3, the operation of the write step and the actual encrypted data operation step are explained separately.

Figure 12:
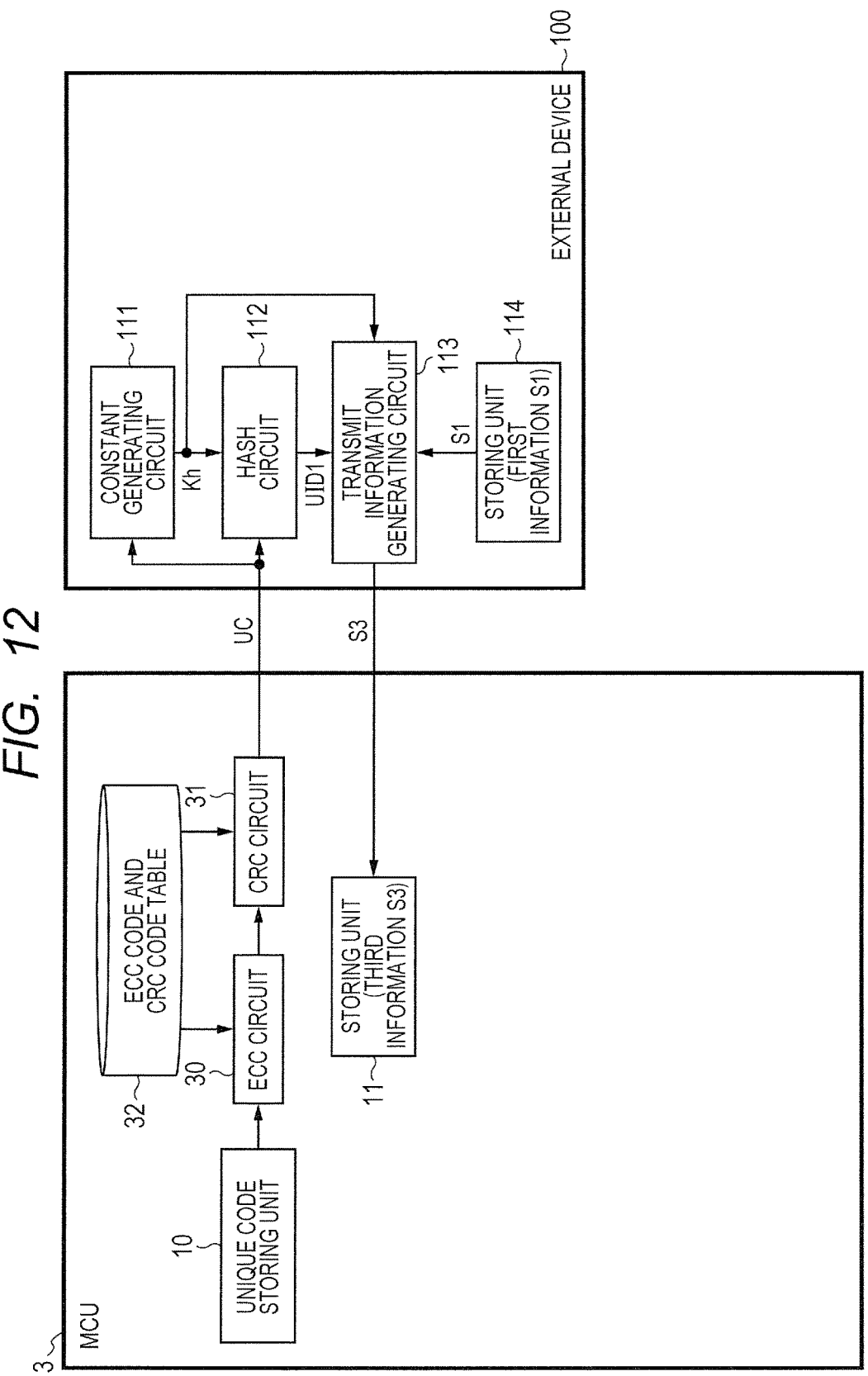
FIG. 12 is a block diagram illustrating a portion utilized at the time of write of first information in the information processing system according to Embodiment 3.

FIG. 12 is a block diagram illustrating a portion utilized by the processing at the write step of the information processing system according to Embodiment 3. As illustrated in FIG. 12, at the write step, the unique code storing unit 10, the received information storing unit 11, the first ECC circuit 30, the first CRC circuit 31, and the correction storing unit 32 of the first semiconductor device 3 are utilized, and the constant generating circuit 111, the external hash circuit 112, the transmit information generating circuit 113, and the external storing unit 114 of the external device 100 are utilized.

Figure 13:
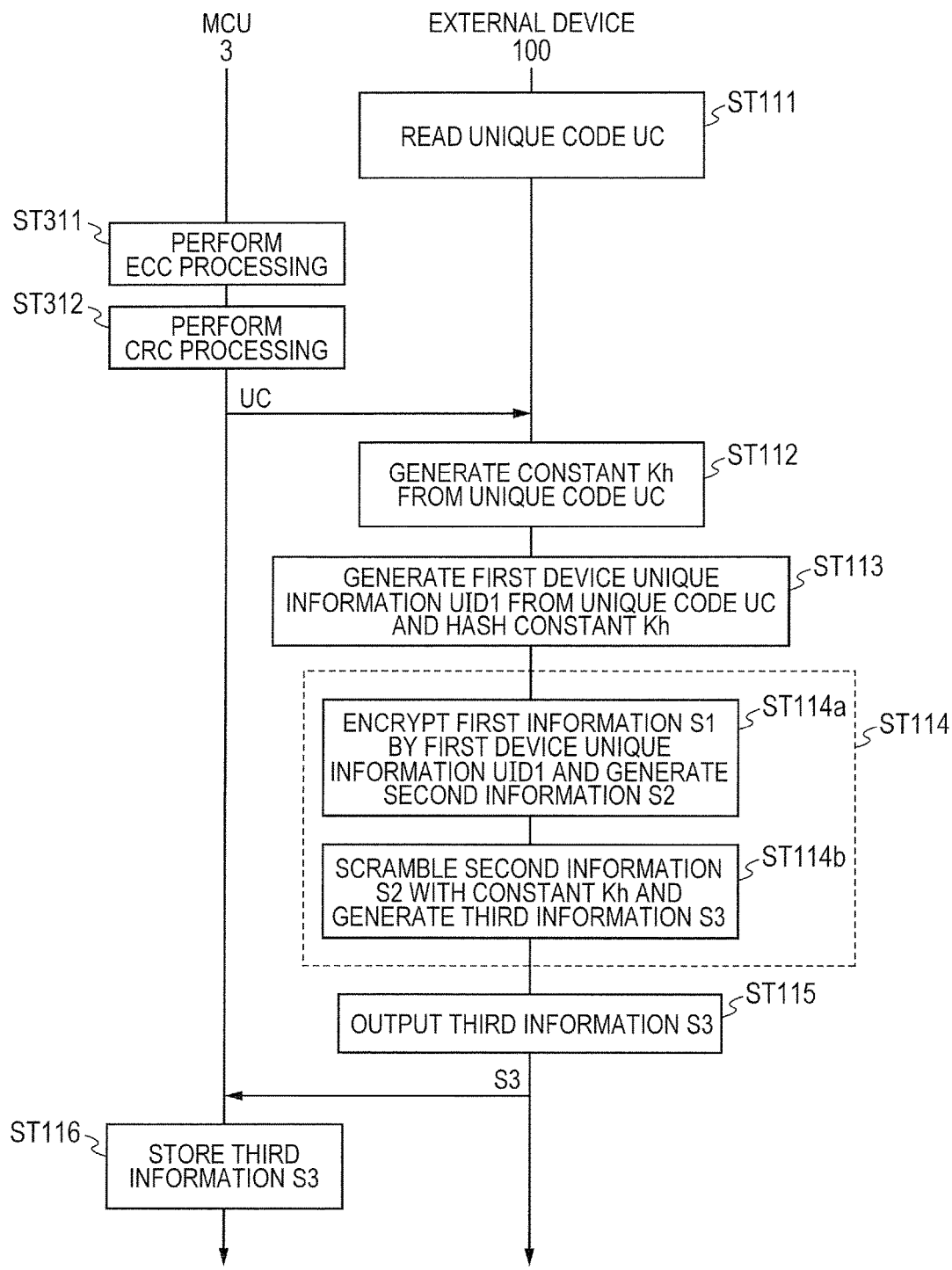
FIG. 13 is a sequence diagram illustrating operation at the time of write of the first information in the information processing system according to Embodiment 3.

Here, operation of the write step of the information processing system according to Embodiment 3 is explained. FIG. 13 is a sequence diagram illustrating operation of the information processing system according to Embodiment 3. As illustrated in FIG. 13, the information processing system according to Embodiment 3 performs operation in which processing at Steps ST311 and ST312 is added to the operation of the information processing system according to Embodiment 1 illustrated in FIG. 3.

Step ST311 is executed in response to read instruction for the external device 100 to read the unique code UC. At Step ST311, the first semiconductor device 3 performs the ECC processing on the unique code UC by utilizing the first ECC circuit 30. Next, at Step ST312, the first semiconductor device 3 performs the error detecting (for example, the CRC processing) by utilizing the CRC circuit 31 on the unique code UC after the ECC processing. Subsequently, the first semiconductor device 3 outputs the unique code UC after the CRC processing to the external device 100. Accordingly, in the information processing system according to Embodiment 3, it is possible to transmit a more reliable unique code UC to the external device 100.

Figure 14:
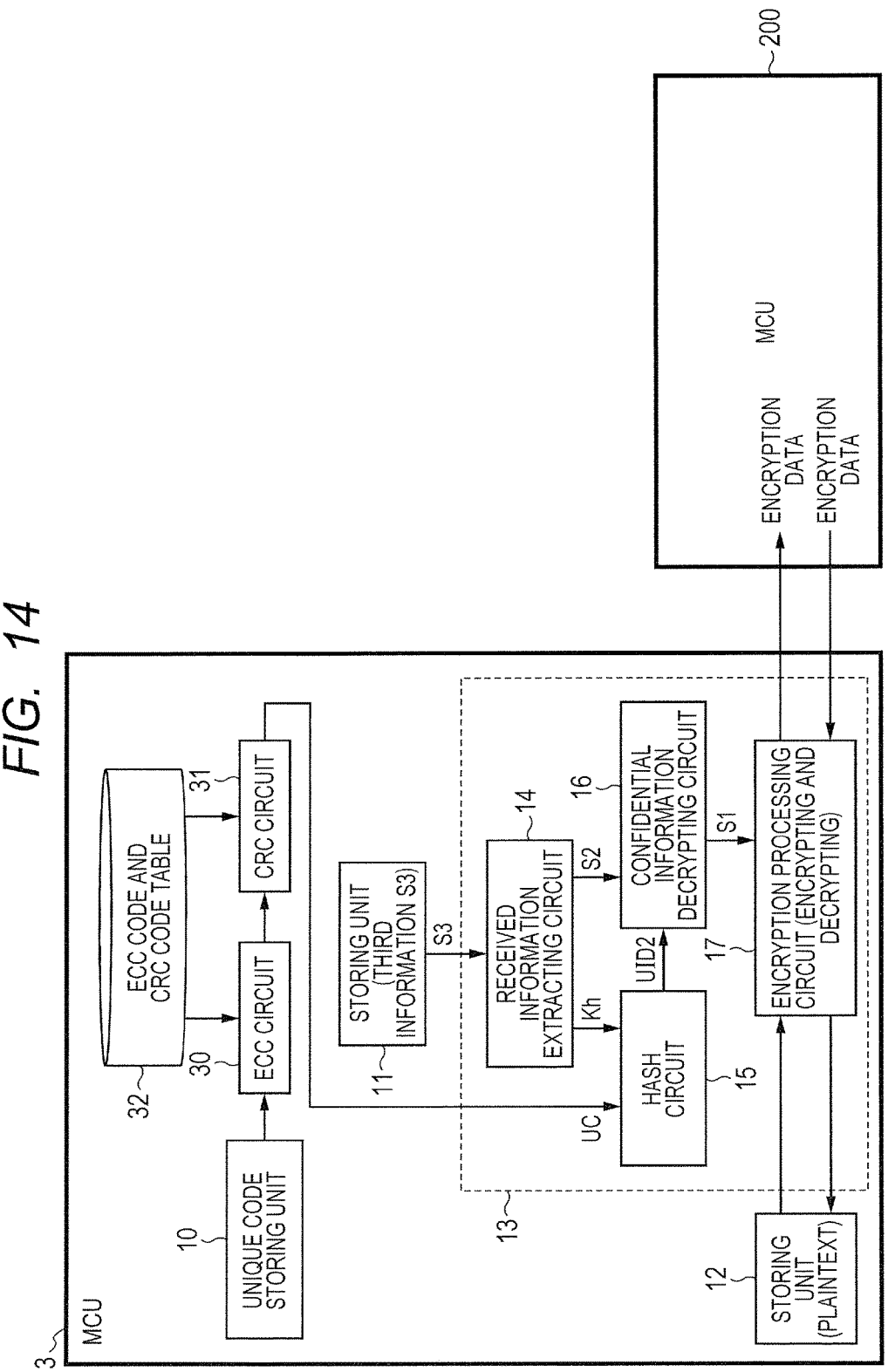
FIG. 14 is a block diagram illustrating a portion utilized in performing encryption communication using the first information in the information processing system according to Embodiment 3.

FIG. 14 is a block diagram illustrating a portion utilized by the processing at the actual encrypted data operation step of the information processing system according to Embodiment 3. As illustrated in FIG. 14, at the actual encrypted data operation step, the unique code storing unit 10, the received information storing unit 11, the data storing unit 12, the encryption circuit 13, the first ECC circuit 30, the first CRC circuit 31, and the correction storing unit 32 of the first semiconductor device 3 are utilized, and the first semiconductor device 3 and the second semiconductor device 200 transmit and receive encrypted data. At the actual encrypted data operation step, the external device 100 is not used and accordingly it is not shown.

Figure 15:
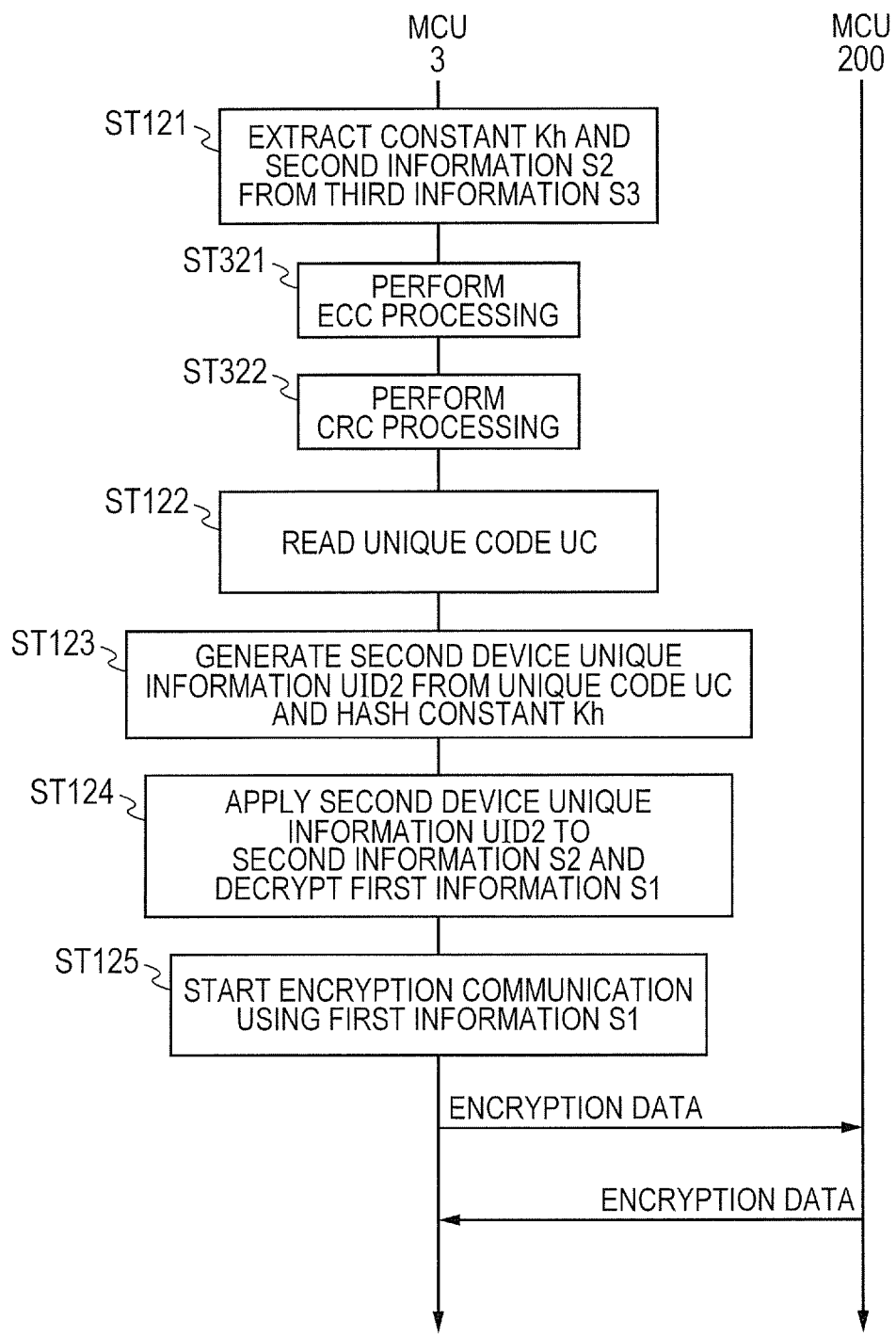
FIG. 15 is a sequence diagram illustrating operation in performing encryption communication using the first information in the information processing system according to Embodiment 3.

Here, operation of the actual encrypted data operation step of the information processing system according to Embodiment 3 is explained. FIG. 15 is a sequence diagram illustrating operation of the information processing system according to Embodiment 3. As illustrated in FIG. 15, the first semiconductor device 3 according to Embodiment 3 performs operations in which processing at Steps ST321 and ST322 is added between Step ST121 and Step ST122 of the first semiconductor device 1 according to Embodiment 1 illustrated in FIG. 5. At Step ST321, the first semiconductor device 3 performs the ECC processing on the unique code UC by utilizing the first ECC circuit 30. Next, at Step ST322, the first semiconductor device 3 performs the error detecting (for example, the CRC processing) by utilizing the first CRC circuit 31 on the unique code UC after the ECC processing. Subsequently, the first semiconductor device 3 outputs the unique code UC after the CRC processing to the first hash circuit 15. Accordingly, in the first semiconductor device 3 according to Embodiment 3, it is possible to perform decryption of the first information S1 with the use of a more reliable unique code UC.

As seen from the above explanation, in the information processing system according to Embodiment 3, it is possible to perform generating of the third information S3 and decrypting of the first information S1 on the basis of the reliable unique code UC by employing the first ECC circuit 30 and the first CRC circuit 31. Accordingly, in the information processing system according to Embodiment 3, it is possible to reduce the rate of occurrence of an error in the generating of the third information S3 and in the decrypting of the first information S1.

Embodiment 4

Figure 16:
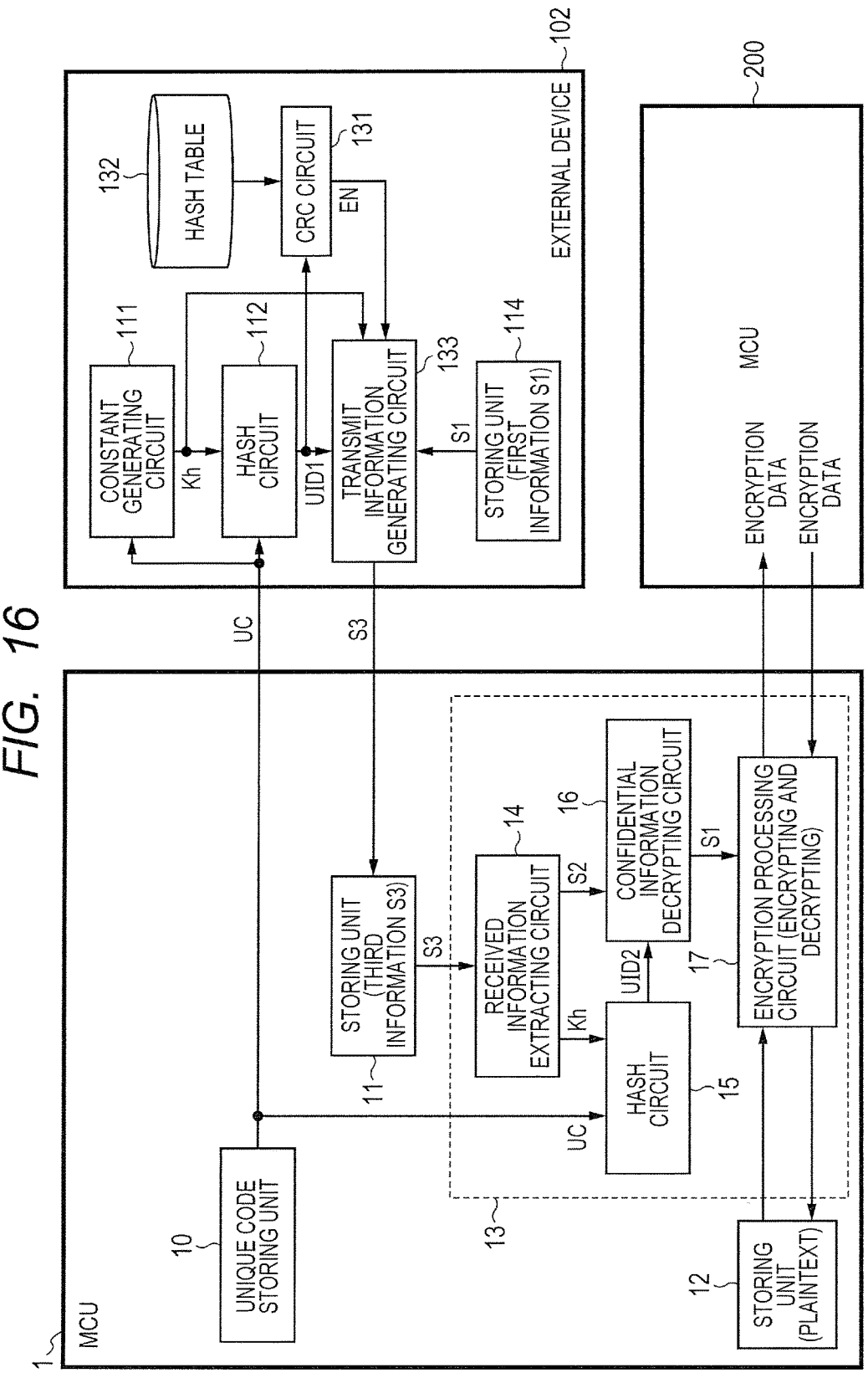
FIG. 16 is a block diagram illustrating an information processing system according to Embodiment 4.

FIG. 16 is a block diagram illustrating an information processing system according to Embodiment 4. As illustrated in FIG. 16, the information processing system according to Embodiment 4 is configured with an external device 102 in lieu of the external device 100. The external device 102 is similar to the external device 100 according to Embodiment 1. However, in Embodiment 4, the external device 102 has an added external CRC circuit 131 and an added external hash storing unit 132 and the transmit information generating circuit 113 is replaced with a transmit information generating circuit 133 which receives an input from the external CRC circuit 131.

The external CRC circuit 131 is a validity checking circuit. The external hash storing unit 132 stores a database (for example, a hash table) in which a valid value is described in advance. The external CRC circuit 131 examines the validity of the external device unique information UID1 with reference to the database stored in the external hash storing unit 132. Then, the external CRC circuit 131 outputs an enabling signal EN which is set to an enabled state when the external device unique information UID1 is valid.

The transmit information generating circuit 133 generates the third information S3 including the second information S2 obtained by encrypting the first information S1 with the use of the external device unique information UID1, as is the case with the Embodiments 1 and 3. However, when the enabling signal EN is in a disenabled state, outputting of the third information S3 is stopped.

Figure 17:
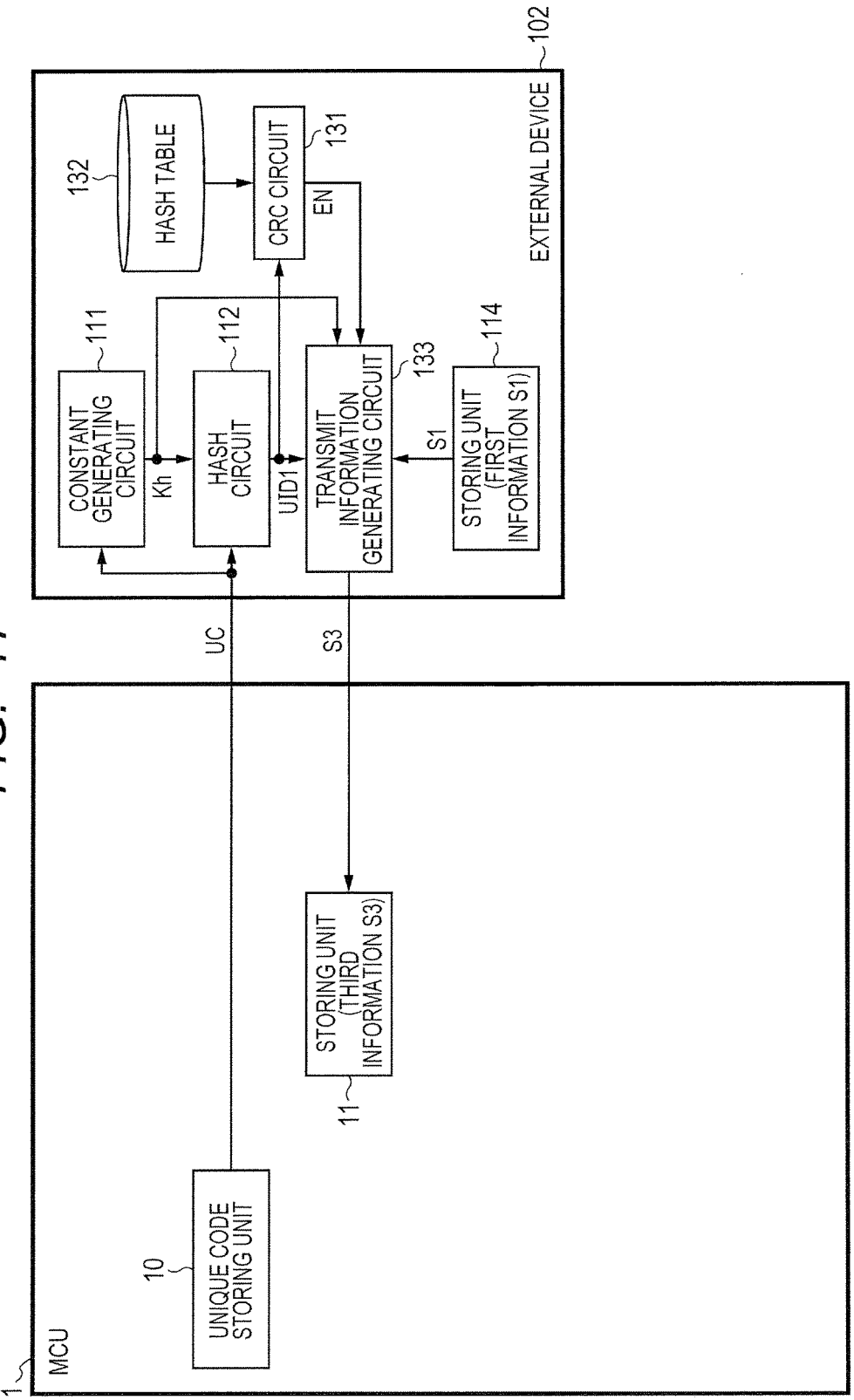
FIG. 17 is a block diagram illustrating a portion utilized at the time of write of first information in the information processing system according to Embodiment 4.

Here, operation of the information processing system according to Embodiment 4 is explained. In the information processing system according to Embodiment 4, the operation at the actual encrypted data operation step is the same as in the other embodiments; therefore, explanation thereof is omitted. The information processing system according to Embodiment 4 has the feature in operation of the external device 102. Accordingly, the following explains the operation of the external device 102 in more detail. FIG. 17 is a block diagram illustrating a portion utilized in processing at a write step in the information processing system according to Embodiment 4. As illustrated in FIG. 17, at the write step, the unique code storing unit 10 and the received information storing unit 11 of the first semiconductor device 1 are utilized, and the constant generating circuit 111, the external hash circuit 112, the external CRC circuit 131, the external hash storing unit 132, the transmit information generating circuit 133, and the external storing unit 114 of the external device 102 are utilized.

Figure 18:
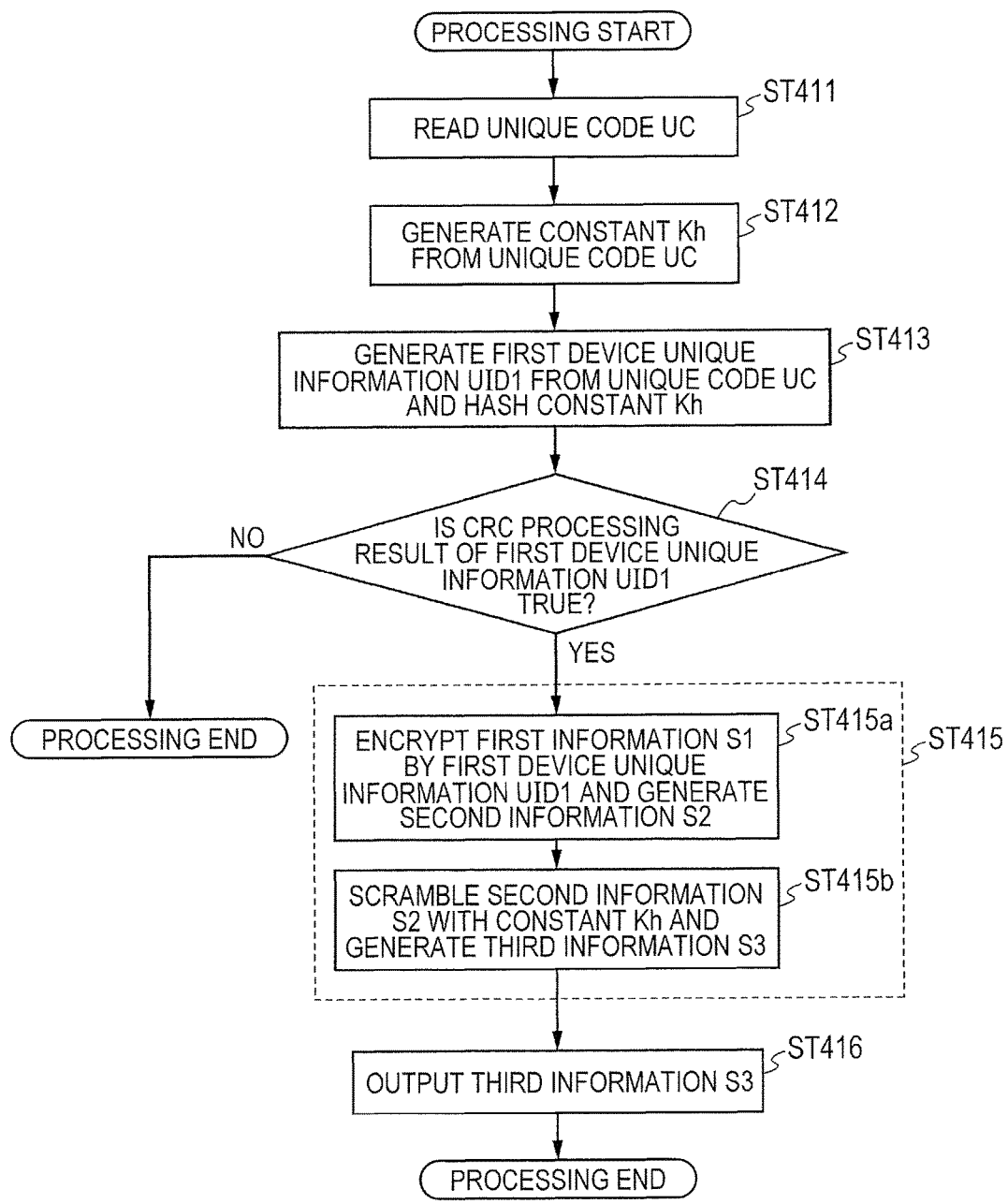
FIG. 18 is a sequence diagram illustrating operation of an external device of the information processing system according to Embodiment 4.

FIG. 18 is a flow chart illustrating operation of the external device 102 according to Embodiment 4. As illustrated in FIG. 18, when processing of the write step is started, the external device 102 first reads the unique code UC from the first semiconductor device 1 (Step ST411). Next, the external device 102 generates the hash constant Kh from the unique code UC by utilizing the constant generating circuit 111 (Step ST412). Next, the external device 102 generates the external device unique information UID1 from the unique code UC and the hash constant Kh by utilizing the external hash circuit 112 (Step ST413). Next, the external device 102 determines the validity of the external device unique information UID1 by utilizing the external CRC circuit 131 (Step ST414). When it is determined that the external device unique information UID1 is not valid in the determination at Step ST414, the external CRC circuit 131 sets the enabling signal EN to a disenabled state to stop generation of the third information S3 by the transmit information generating circuit 133, and terminates the processing.

On the other hand, when it is determined that the external device unique information UID1 is valid in the determination at Step ST414, the external CRC circuit 131 sets the enabling signal EN to an enabled state. Accordingly, the transmit information generating circuit 133 starts generation of the third information S3 at Step ST415. First, the transmit information generating circuit 133 encrypts the first information S1 with the external device unique information UID1, to generate the second information S2 (Step ST415a). Next, the transmit information generating circuit 133 performs scrambling to the second information S2 with the use of the hash constant Kh, to generate the third information S3 (Step ST415b). Then, the external device 102 outputs the third information S3 from the transmit information generating circuit 133 (Step ST416) and terminates the processing.

As seen from the above explanation, in the information processing system according to Embodiment 4, the external device 102 determines the validity of the external device unique information UID1 generated on the basis of the unique code UC acquired from the first semiconductor device 1. The unique code UC is written in at the time of manufacture of the first semiconductor device 1. Accordingly, the manufacturer or those who obtained the information from the manufacturer legally are able to know in advance the external device unique information S1 generated from the unique code UC. That is, only a legal operator can acquire the hash table stored in the external hash storing unit 132. Therefore, when the first semiconductor device 1 coupled to the external device 102 is not a genuine product for example, the external device unique information UID1 generated from the unique code UC acquired therefrom becomes a different value from the value described in the hash table. Therefore, by employing the external device 102, it can be determined whether the first semiconductor device 1 is a genuine product, and the first information S1 can be written only in the genuine product. Owing to such a scheme, it is possible to prevent the disclosure of the first information S1 through non-genuine products, by employing the external device 102.

Owing to the determination of a genuine product and a non-genuine product, it is also possible to prevent the damage that the user of the first semiconductor device 1 may cause by utilizing a wrong semiconductor device. That is, it is possible to improve the reliability of the product itself by employing the external device 102 according to Embodiment 4.

Embodiment 5

Figure 19:
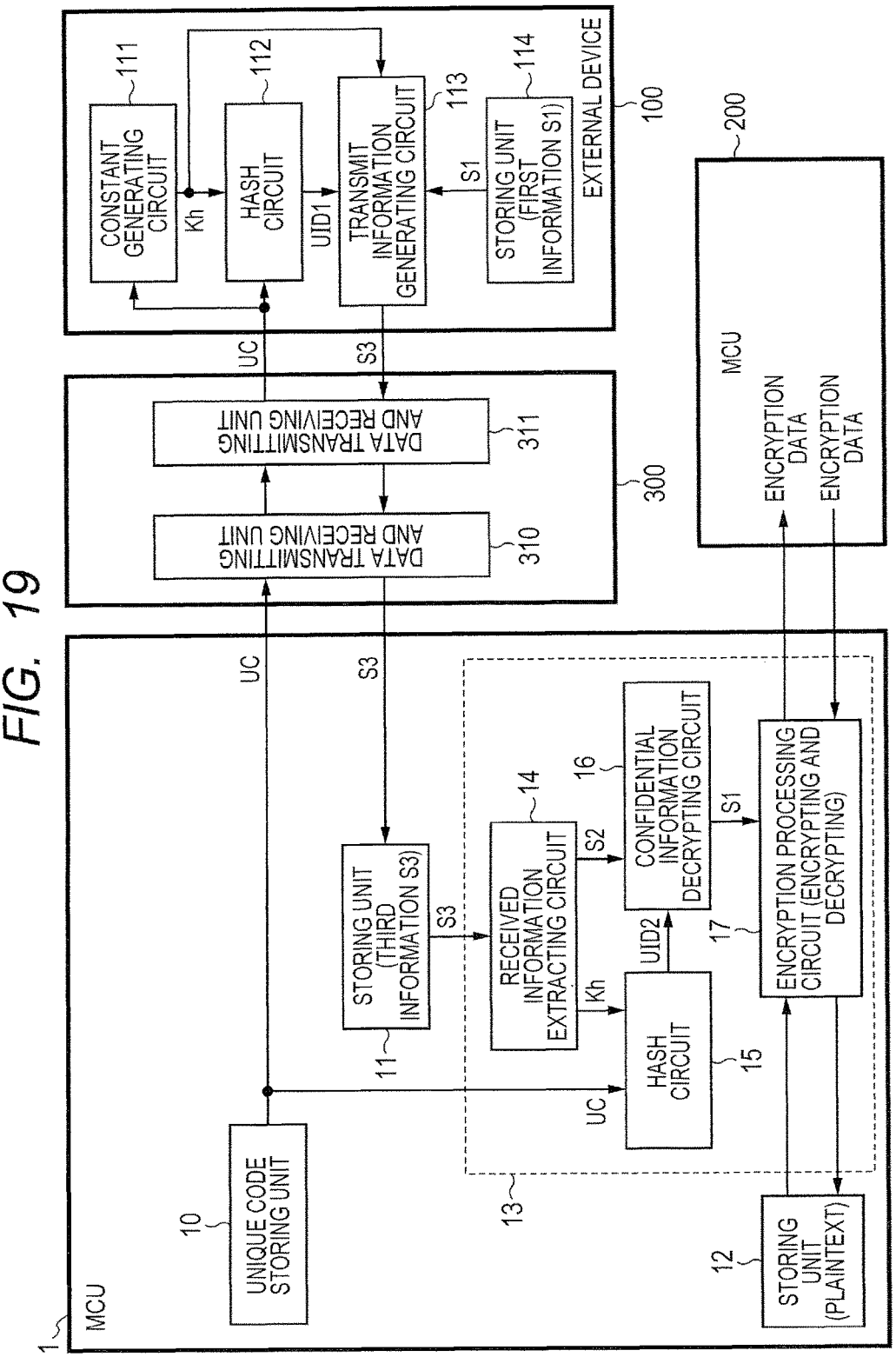
FIG. 19 is a block diagram illustrating an information processing system according to Embodiment 5.

FIG. 19 is a block diagram illustrating an information processing system according to Embodiment 5. As illustrated in FIG. 19, the information processing system according to Embodiment 5 is similar to the information processing system according to Embodiment 1 but with a repeater device 300 added. In the information processing system according to Embodiment 5, the first semiconductor device 1 and the external device 100 communicate through the repeater device 300.

The repeater device 300 is configured with a data transmitting and receiving unit 310 and a data transmitting and receiving unit 311. The data transmitting and receiving unit 310 is coupled to the first semiconductor device 1, and the data transmitting and receiving unit 311 is coupled to the external device 100. The repeater device 300 performs wired communication or wireless communication between the data transmitting and receiving unit 310 and the data transmitting and receiving unit 311, and relays the communication between the first semiconductor device 1 and the external device 100. For example, the repeater device 300 may be a device which relays information between distant places in the same site, or may be a public network or the like which performs communication between distant sites.

Figure 20:
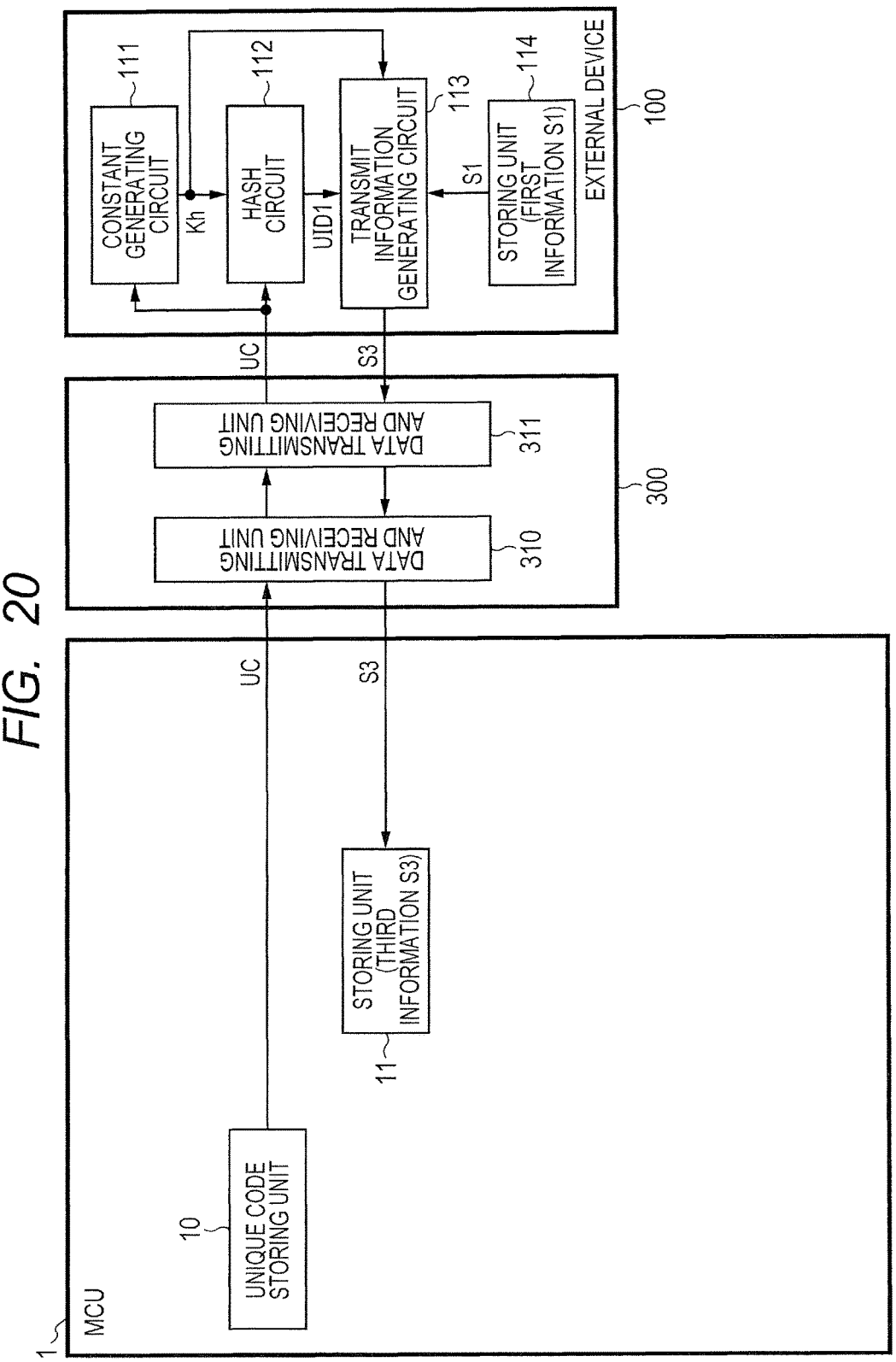
FIG. 20 is a block diagram illustrating a portion utilized at the time of write of first information in the information processing system according to Embodiment 5.

Here, operation of the information processing system according to Embodiment 5 is explained. In the information processing system according to Embodiment 5, the operation at the actual encrypted data operation step is the same as in the other embodiments; therefore, explanation thereof is omitted. FIG. 20 is a block diagram illustrating a portion utilized by the processing at the write step of the information processing system according to Embodiment 5. As illustrated in FIG. 20, the blocks of the first semiconductor device 1 and the external device 100 which are utilized at the write step are the same as the blocks according to Embodiment 1 illustrated in FIG. 2. However, in the information processing system according to Embodiment 5, the first semiconductor device 1 and the external device 100 are coupled through the repeater device 300 at the write step.

As seen from the above explanation, in the information processing systems explained in the other embodiments, security in the communication path is secured. Therefore, as in the information processing system according to Embodiment 5, writing of the first information S1 through the repeater device 300 presents no problem with security.

Furthermore, by coupling the first semiconductor device 1 and the external device 100 by use of the repeater device 300, it is possible to install the external device 100 in the place where the security management is adequate, thereby preventing the leak of information due to theft for example, from the external device 100.

As described above, the invention accomplished by the present inventors has been concretely explained based on the embodiments. However, it cannot be overemphasized that the present invention is not restricted to the embodiments described above, and it can be changed variously in the range which does not deviate from the gist.

What is claimed is:

1. A semiconductor device comprising:
a unique code storing unit configured to store a unique code as a value unique to the semiconductor device;
a received information storing unit configured to store third information generated by and acquired from an external device, the third information including at least second information obtained by encrypting first information stored in said external device with the use of external device unique information generated from the unique code;
a principal unique information generating circuit configured to generate principal device unique information with the use of both the unique code and a portion of the third information generated by the external device;
a decrypting circuit configured to decrypt the second information with the use of the principal device unique information to recover the first information at the semiconductor device; and
an encryption processing circuit configured to perform encrypting and decrypting of communication object information with the use of the recovered first information, wherein:
the external device unique information is a hash constant generated from the unique code and a hash value calculated from the unique code;
the third information includes the second information and the hash constant;
the principal device unique information is distinct from all five of the unique code, the hash constant, the third information, the second information and the first information; and
the recovered first information is not embedded in the semiconductor device.

2. The semiconductor device according to claim 1, wherein the principal unique information generating circuit outputs a hash value of the unique code and a portion of the third information, as the principal device unique information.

3. The semiconductor device according to claim 1, wherein the semiconductor device further comprises:
a received information extracting circuit configured to extract the hash constant and the second information from the third information,
wherein the principal unique information generating circuit outputs a hash value calculated from the unique code and the extracted hash constant as the principal device unique information, and
wherein the decrypting circuit performs decrypting to the second information outputted from the received information extracting circuit with the use of the principal device unique information.

4. The semiconductor device according to claim 3, wherein the third information is generated by scrambling the second information with the hash constant.

5. The semiconductor device according to claim 1 further comprising:
at least one of an error correction circuit configured to perform error correcting on the unique code and an error detection circuit configured to perform error detecting on the unique code,
wherein the principal unique information generating circuit generates the principal device unique information on the basis of the unique code on which processing by at least one of the error correction circuit and the error detection circuit has been performed.

6. The semiconductor device according to claim 1, wherein the unique code storing unit is a nonvolatile memory.

7. An information processing system comprising:
a semiconductor device; and
an external device,
wherein the external device comprises:
an external unique information generating circuit configured to acquire a unique code as a value unique to the semiconductor device from the semiconductor device, and configured to generate external device unique information from the unique code; and
a transmit information generating circuit configured to generate third information including at least second information obtained by encrypting first information stored in said external device with the use of the external device unique information, and
wherein the semiconductor device comprises:
a unique code storing unit configured to store the unique code;
a received information storing unit configured to store the third information including the second information acquired from the external device;
a principal unique information generating circuit configured to generate principal device unique information with the use of both the unique code and a portion of the third information generated by the external device; and
a decrypting circuit configured to decrypt the second information with the use of the principal device unique information to recover the first information;
an encryption processing circuit configured to perform encrypting and decrypting of communication object information with the use of the recovered first information; and wherein:
the principal device unique information is distinct from all four of the unique code, the third information, the second information and the first information; and
the recovered first information is not embedded in the semiconductor device.

8. The information processing system according to claim 7, wherein the external and the principal unique information generating circuits each output a hash value of the unique code and a portion of the third information, as the external and principal device unique information, respectively.

9. The information processing system according to claim 7,
wherein the external device further comprises:
a constant generating circuit configured to generate a constant having a value corresponding to the unique code,
wherein the external unique information generating circuit generates the external device unique information with the use of the constant and the unique code,
wherein the transmit information generating circuit generates the third information including the second information and the constant,
wherein the semiconductor device further comprises:
a received information extracting circuit configured to extract the second information and the constant from the third information, and
wherein the principal unique information generating circuit generates the principal device unique information with the use of the unique code and the constant outputted from the received information extracting circuit.

10. The information processing system according to claim 9,
wherein the constant generating circuit outputs a hash value of the unique code as the constant.

11. The information processing system according to claim 9,
wherein the external and the principal unique information generating circuits each output a hash value corresponding to the unique code and the constant, as the external and the principal device unique information, respectively.

12. The information processing system according to claim 9,
wherein the transmit information generating circuit scrambles the second information with the constant to generate the third information.

13. The information processing system according to claim 7,
wherein the external device further comprises:
a validity checking circuit configured to check the validity of the external device unique information with reference to a database with a valid value described in advance, and configured to output an enabling signal turning to an enabled state when the external device unique information is valid, and
wherein the transmit information generating circuit stops outputting the third information when the enabling signal is in a disenabled state.

14. The information processing system according to claim 7,
wherein the external device and the semiconductor device communicate with each other via a repeater device which relays the communication between the external device and the semiconductor device.

15. The information processing system according to claim 7,
wherein the semiconductor device comprises:
at least one of an error correction circuit configured to perform error correcting on the unique code and an error detection circuit configured to perform error detecting on the unique code,
wherein the external unique information generating circuit generates the principal device unique information on the basis of the unique code on which processing by at least one of the error correction circuit and the error detection circuit has been performed, and
wherein the external device receives the unique code to which processing by at least one of the error correction circuit and the error detection circuit has been performed.

16. The information processing system according to claim 7,
wherein the unique code storing unit is a nonvolatile memory.

17. A semiconductor device configured for encrypted communication, comprising:
a unique code storing unit configured to store a unique code as a value unique to the semiconductor device, the unique code being an error-free value not derived from a physically unclonable function;
a received information storing unit configured to store encrypted key information generated and outputted by an external device, the encrypted key information comprising a secret key stored in said external device and encrypted with external device unique information generated from the unique code;
a principal unique information generating circuit configured to generate principal device unique information from the unique code stored in the unique code storing unit;
a decrypting circuit configured to (a) acquire the principal device unique information from the principal unique information generating circuit, (b) acquire the encrypted key information directly from the received information storing unit, and (c) recover the secret key using only the principal device unique information and the encrypted key information generated by the external device; and
an encryption processing circuit configured to perform encrypted communication with information encrypted using the recovered secret key; wherein:
the decrypting circuit acquires the encrypted key information directly from the received information storing unit without the encrypted key information first having to be extracted from scrambled encrypted key information stored in the received information storing unit;
the principal device unique information is distinct from all three of the unique code, the encrypted key information and the secret key; and
the recovered secret key is not embedded in the semiconductor device.

18. The semiconductor device according to claim 17, wherein the principal unique information generating circuit outputs a hash value of the unique code as the principal device unique information.

19. The semiconductor device according to claim 18, wherein the external device unique information and the principal device unique information are created independently as hash values of the unique code and represent the same hash value.

20. An information processing system configured for encrypted communication, comprising:
a semiconductor device comprising:
a unique code storing unit configured to store a unique code as a value unique to the semiconductor device, the unique code being an error-free value not derived from a physically unclonable function;
a received information storing unit configured to store encrypted key information generated and outputted by an external device, the encrypted key information comprising a secret key encrypted with external device unique information generated from the unique code;

a principal unique information generating circuit configured to generate principal device unique information from the unique code stored in the unique code storing unit;

a decrypting circuit configured to (a) acquire the principal device unique information from the principal unique information generating circuit, (b) acquire the encrypted key information generated by the external device, directly from the received information storing unit, and (c) recover the secret key using only the principal device unique information and the encrypted key information generated by said external device; and an encryption processing circuit configured to perform encrypted communication with information encrypted using the recovered secret key, wherein:

the decrypting circuit acquires the encrypted key information directly from the received information storing unit without the encrypted key information first having to be extracted from scrambled encrypted key information stored in the received information storing unit;

the recovered secret key is not embedded in the semiconductor device; and the principal device unique information is distinct from all three of the unique code, the encrypted key information and the secret key; and an external device in operative communication with the semiconductor device, wherein the external device comprises:

an external storing unit configured to store secret key information of the semiconductor device;

an external unique information generating circuit configured to generate said external device unique information from the unique code of the semiconductor device, after receiving said unique code from the semiconductor device; and a transmit information generating circuit configured to encrypt the stored secret key information with the external device unique information, to thereby create said encrypted key information, and output said encrypted key information to the semiconductor device.

21. The information processing system according to claim 20, wherein:

the external unique information generating circuit generates said external device unique information based solely on the unique code of the semiconductor device; and the transmit information generating circuit encrypts the stored secret key information with the external device unique information alone, to thereby create said encrypted key information.

22. The information processing system according to claim 21, wherein:

the unique code storing unit of the semiconductor device and the external storing unit of the external device both comprise nonvolatile memory.

23. The information processing system according to claim 20, wherein:

the semiconductor device is devoid of both error correction circuitry and cyclic redundancy check circuitry configured to check the unique code; and the external device is devoid of circuitry configured to determine validity of the external device unique information.

24. The information processing system according to claim 20, wherein:

the external unique information generating circuit and the principal unique information generating circuit both output a hash value of the unique code as the external device unique information and the principal device unique information, respectively; and the external device unique information and the principal device unique information represent the same hash value.

25. The information processing system according to claim 20, wherein the semiconductor device is a first semiconductor device and wherein the information processing system further comprises:

a second semiconductor device configured to perform encrypted communication with the first semiconductor device with information encrypted using the recovered secret key.

* * * * *